US006185667B1

(12) United States Patent
Abercrombie et al.

(10) Patent No.: US 6,185,667 B1
(45) Date of Patent: *Feb. 6, 2001

(54) INPUT/OUTPUT SUPPORT FOR PROCESSING IN A MESH CONNECTED COMPUTER

(75) Inventors: Andrew P. Abercrombie, Winter Park; Surachai Sutha, Orlando, both of FL (US); Wlodzimierz Holsztynski, Mountain View, CA (US)

(73) Assignee: TeraNex, Inc., Orlando, FL (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/057,468

(22) Filed: Apr. 9, 1998

(51) Int. Cl.[7] .................................................. G06F 15/00
(52) U.S. Cl. ................................. 712/11; 712/13; 712/14; 712/22
(58) Field of Search .................................. 712/11, 13, 14, 712/16, 18, 21, 22

(56) References Cited

U.S. PATENT DOCUMENTS

| 3,287,703 | 11/1966 | Slotnick ..................................... 710/1 |
| 3,643,236 | 2/1972 | Kolankowsky et al. ............... 365/49 |
| 3,815,095 | 6/1974 | Wester ............................ 395/800.11 |
| 4,167,780 | 9/1979 | Hayashi ........................... 395/183.06 |
| 4,187,551 | 2/1980 | Nutter et al. .......................... 711/100 |

(List continued on next page.)

FOREIGN PATENT DOCUMENTS

| 0223690 | 5/1987 | (EP) . |
| 0237218 | 9/1987 | (EP) . |
| 0 256 661 | 2/1988 | (EP) . |
| 0539595A1 | 5/1993 | (EP) . |
| WO86/03038 | 5/1986 | (WO) . |
| WO90/04235 | 4/1990 | (WO) . |
| WO 9608778 | 3/1996 | (WO) . |

OTHER PUBLICATIONS

Timothy Bridges, "The GPA Machine: A Generally Partitionable MS/MD Architecture", IEEE , pp. 196–203, Feb. 1990.*

(List continued on next page.)

Primary Examiner—Larry D. Donaghue
Assistant Examiner—Dzung C. Nguyen
(74) Attorney, Agent, or Firm—Burns, Doane, Swecker & Mathis, LLP

(57) ABSTRACT

An apparatus for processing data has a Single-Instruction-Multiple-Data (SIMD) architecture, and a number of features that improve performance and programmability. The apparatus includes a rectangular array of processing elements and a controller. The apparatus offers a number of techniques for shifting image data within the array. A first technique, the ROLL option, simultaneously shifts image planes in opposite directions within the array. A second technique, the gated shift option, makes a normal shift of an image plane to neighboring PEs conditional, for each PE, upon a value stored in a pattern register of each PE. A third technique, the carry propagate option, combines the computations from multiple PEs in order to complete an n-bit operation in fewer than n clocks by forming "supercells" within the array. The apparatus also includes a multi-bit X Pattern register and a multi-bit Y Pattern register. These registers have bit values corresponding to respective columns (for the X Pattern register) and rows (for the Y Pattern register) of the array. Patterns can be propagated from these registers into corresponding rows and columns. Further these registers can be used to receive values representing the logical OR of signals generated by individual PEs within respective rows and columns. Further, a number of global data registers are used to store information which can be broadcast back into the processing array.

24 Claims, 15 Drawing Sheets

U.S. PATENT DOCUMENTS

| | | | |
|---|---|---|---|
| 4,215,401 | 7/1980 | Holxztynski et al. | 382/304 |
| 4,309,755 | 1/1982 | Lanty | 395/841 |
| 4,314,349 | 2/1982 | Batcher | 364/716.01 |
| 4,384,273 | 5/1983 | Ackland et al. | 382/215 |
| 4,489,381 | 12/1984 | Lavallee et al. | 711/117 |
| 4,507,726 | 3/1985 | Grinberg et al. | 395/800.11 |
| 4,511,967 | 4/1985 | Witalka et al. | 710/1 |
| 4,517,659 | 5/1985 | Chamberlain | 395/800.11 |
| 4,524,455 | 6/1985 | Holsztynski et al. | 382/303 |
| 4,533,993 | 8/1985 | McCanny et al. | 395/800.16 |
| 4,541,115 | 9/1985 | Werth | 382/159 |
| 4,546,428 | 10/1985 | Morton | 395/800.18 |
| 4,573,116 | 2/1986 | Ong et al. | 711/211 |
| 4,574,394 | 3/1986 | Holsztynski et al. | 382/303 |
| 4,628,481 | 12/1986 | Reddaway | 395/800.11 |
| 4,635,292 | 1/1987 | Mori et al. | 382/304 |
| 4,660,155 | 4/1987 | Thaden et al. | 214/37.5 |
| 4,667,308 | 5/1987 | Hayes et al. | 365/230.02 |
| 4,720,780 | 1/1988 | Dolecek | 395/800.18 |
| 4,739,474 | 4/1988 | Holsztynski | 395/800.4 |
| 4,739,476 | 4/1988 | Fiduccia | 395/800.22 |
| 4,742,552 * | 5/1988 | Andrews | 382/303 |
| 4,752,893 | 6/1988 | Guttag et al. | 395/133 |
| 4,769,779 | 9/1988 | Chang et al. | 708/622 |
| 4,884,190 | 11/1989 | Ngai et al. | 395/800.04 |
| 4,933,846 | 6/1990 | Humphrey et al. | 710/107 |
| 5,038,282 | 8/1991 | Gilbert et al. | 395/800.14 |
| 5,095,527 | 3/1992 | Uramoto et al. | 395/800.14 |
| 5,179,714 | 1/1993 | Graybill | 395/800.19 |
| 5,253,308 * | 10/1993 | Johnson | 395/800.11 |
| 5,276,819 | 1/1994 | Rau et al. | 711/214 |
| 5,305,462 * | 4/1994 | Grondalski | 395/800.15 |
| 5,421,019 | 5/1995 | Holsztynski et al. | 395/800.14 |
| 5,606,707 | 2/1997 | Tomassi et al. | 345/418 |
| 5,822,608 * | 10/1998 | Dieffenderfer et al. | 395/800.2 |

OTHER PUBLICATIONS

Hungwen LI et al., "Reconfigurable SIMD Massively Parallel Computers," Proceedings of the IEEE, vol. 79, No. 4, Apr. 1991, pp. 429–443.

Charles C. Weems et al., "Image Understanding Architecture: Exploiting Potential Parallelism in Machine Vision," vol. 25, No. 2, Feb. 1992, pp. 65–68.

Charles C. Weems et al., "Real–Time Considerations in the Design of the Image Understanding Architecture," vol. 2, No. 6, Dec. 1996, pp. 341–350.

John T. Burkley, MPP VLSI Multiprocessor Integrated Circuit Design, published in *The Massively Parallel Processor*, pp. 206–216, ed. J.L. Potter, (MIT Press, 1985).

W.F. Wong & K.T. Lua, "A preliminary evaluation of a massively parallel processor: GAPP," *Microprocessing and Microprogramming*, pp. 53–62, vol. 29, No. 1, Jul. 1990, Amsterdam, NL.

Alcolea et al., "FAMA Architecture: Implementation details," *Proceedings of IECON '87: 1987 International Conference on Industrial Electronics, Control, and Instrumentation*, pp. 737–744, vol. 2, Nov. 3–6, 1987, Cambridge, Massachusetts.

A. Boubekeur et al., "A Real Experience on Configuring a Wafer Scale 2–D Array of Monobit Processors," *IEEE Transactions on Components, Hybrids, and Manufacturing Technology*, pp. 637–644, vol. 16, No. 7, Nov. 1993, New York, U.S.

Donald W. Blevins, et al., "Processing Element and Custom Chip Architecture for the BLITZEN Massively Parallel Processor," Technical Report TR87–22, pp. 1–27, published Oct. 22, 1987, by The Microelectronics Center of North Carolina.

R. Michael Hord, "Parallel Supercomputing in SIMD Architectures, " pp. 85–90; 143–149; 205–217; 312–324; and 356–359, published 1990 by CRC Press.

Charles C. Weems et al., "The Image Understanding Architecutre," pp. 21–27, Coins Technical Report 87–76.

John Smit, "Architecture Descriptions for the Massively Parallel Processor (MPP) and the Airborne Associative Processor (ASPRO)," published Aug. 8, 1980 by Goodyear Aerospace Corporation GER–16785.

"An Evaluation of Some Chips for Image Processing," by T. J. Fountain for University College London, Department of Physics and Astronomy.

"Geometric Arithmetic Parallel Processor", NCR publication, Model No. NCR45CG72.

J. R. Rochez, "Calculateur Cellulaire Universel Destine a L'Etude Des Structures Cellulaires Specialisees," *Digital Processes*, vol. 3, No. 2, pp. 121–138 (1977).

P. Franzon, "Interconnect Strategies for Fault Tolerant 2D VLSI Arrays," *IEEE International Conference on Computer Design: VLSI in Computers* pp. 230–233, Oct. 1986.

\* cited by examiner

|     | 802 | 804 | 806 |     |
|-----|-----|-----|-----|-----|
|     | NS=1 | NS=1 | NS=1 |     |
|     | EW=0 | EW=0 | EW=0 |     |

FIG. 8A

|     | 802 | 804 | 806 |     |
|-----|-----|-----|-----|-----|
|     | NS=0 | NS=1 | NS=1 |     |
|     | EW=0 | EW=0 | EW=1 |     |

FIG. 8B

|     | 802 | 804 | 806 |     |
|-----|-----|-----|-----|-----|
|     | NS=0 | NS=0 | NS=1 |     |
|     | EW=0 | EW=1 | EW=1 |     |

FIG. 8C

INPUT/OUTPUT SUPPORT FOR PROCESSING IN A MESH CONNECTED COMPUTER

CROSS-REFERENCE TO RELATED APPLICATIONS

The present application is related to commonly assigned U.S. application Ser. No. 09/057,468 (our reference No. 017750-351), entitled "Mesh Connected Computer," filed on an even date herewith, which is incorporated herein by reference in its entirety.

Some aspects of this invention were made with Government support under Contract No. F08630-95-2-0001 awarded by Air Force Wright Laboratory Armament Directorate. The Government may have certain rights in this invention.

BACKGROUND

The present invention relates to parallel computing, and more particularly to (Single Instruction-Multiple-Data) SIMD mesh connected computing.

In certain types of parallel processing, an array of processor elements (PEs), or cells, is configured so that each PE performs logical or arithmetic operations on its own data at the same time that all other PEs are processing their own data. This can reduce the amount of time required to process the data. As such, these arrays are particularly well suited for real-time processing tasks, such as processing image data collected by one or more sensors. Parallel processors are used in both military and civilian applications.

A typical parallel processor of the above-mentioned type includes a rectangular array of PEs, with each interior PE being connected to its four nearest neighboring PEs (designated north, south, east and west) and each edge PE being connected to a data input/output device. As a result of this configuration, a mesh of processing elements is formed. The term "Mesh Connected Computer" (MCC) is often used to describe this architecture.

In a MCC, each PE is also connected to a master controller which coordinates operations on data throughout the array by providing appropriate instructions to the PEs. Machines in which the logical or arithmetic operation being performed at any instant in time is identical for all PEs in the array are referred to by several names, including Single Instruction-Multiple Data (SIMD) machines. U.S. patent application Ser. No. 08/112,540 (the '540 Application), which was filed on Aug. 27, 1993 in the name of Meeker, describes one example of a SIMD architecture computer. The '540 Application is incorporated by reference herein in its entirety. On the other hand, machines that issue different instructions to different PEs (which may contain different data) are referred to as Multiple Instruction-Multiple Data (MIMD) machines.

Because the PEs in SIMD machines are all issued the same instruction, the complexity of the SIMD PEs and supporting hardware can be reduced. This is typically an important factor, because the PE will be repeated many times, so that any increase in the size, processing, and power requirements for each PE will be multiplied many times. It is often desirable to minimize the size of the parallel processor to accommodate limited space within housings, and other environmental limitations.

While SIMD machines offer a number of benefits, they also present a number of challenges. First, a SIMD architecture designer must address the challenge of moving information into and out of the array in a timely manner. This task can be a complex matter because many PEs in the array are connected to only neighboring PEs, rather than directly connected to an input/output interface.

The processor disclosed in the '540 Application accomplishes this task, in part, by using a CM (communication) plane. The CM plane interfaces with one row of the array, such as the "southern-most" row in the array. The information provided by the CM plane is then shifted northward via an internal CM bus from one row of PEs to the next. This process continues with each row of PEs shifting data to their northern neighbors while the rows receive new data from the south. Output data is transferred from the parallel processor array in an analogous manner.

The '540 Application also includes a mechanism for extracting particular values from an entire image plane using a global OR (or "GLOR") function. In the global OR processing function, signals from each respective PE in the array are OR-ed together (e.g., CHIP_GLOR=glor_pe(0)+ glor_pe(1)+glor_pe(2)+ ... glor_pe(n), where glor_pe(i) denotes a signal generated by the $i^{th}$ PE). The CHIP_GLOR signal, through output to external circuitry, can then be used to extract "target" data.

While the above-described techniques are effective in moving information into and out of the array, there remains room for improvement regarding this aspect of the parallel processor. For instance, the above-identified inventors determined that it would be desirable to increase the number of options in which information can be extracted from the array, and also provide a mechanism by which information can be more efficiently globally broadcast back into the array (or broadcast into part of the array).

Second, once the image data is stored within the array, the system designer must address the issue of how to shift the data within the array so that each PE receives its proper operands in a timely manner. One technique for accomplishing this task described in the '540 Application is to shift the image data row-by-row in the north-south direction, or shift the data column-by-column in the east-west direction. For instance, in response to a clock signal, a particular PE could transfer information from its north input (i.e., its "ni" input) and store this information into a north-south register (ns_reg).

While the above shift operation is effective, there again remains room for improvement regarding this aspect of the parallel processor. The above-identified inventors determined that it would be desirable to increase the versatility in which image information can be shifted within the array, so as to ultimately increase the speed at which information can be shifted within the array, and also to facilitate certain types of image operations, such as image shuffling and histogram processing.

Any increase in the versatility of the parallel processor may also increase its complexity. As described above, the complexity of each PE may be directly proportional to its size, processing and power requirements. Accordingly, the designer must carefully balance the goal of improving the versatility of the parallel processor with the potential negative consequences of making the array too complex. Needless to say, this is a difficult design challenge.

Furthermore, the principal design paradigm of a SIMD processor dictates that all PE's within the array carry out the same instruction at the same time. In certain circumstances, the above-identified inventors determined that it might be desirable to increase the versatility of the processing array by making one or more PEs "behave" in a manner which differs from other PEs. But this divergence in function is seemingly at odds with the SIMD design philosophy. This too presents another dimension to an already difficult design challenge.

SUMMARY

It is therefore a general object of the invention to improve the versatility of a Mesh Connected Computer so that information can be more efficiently and quickly input into the processing array, manipulated within the array, and subsequently output from the array.

It is a further object of the invention to improve the versatility of a Mesh Connected Computer in an efficient manner which does not unduly increase the complexity of the mesh connected computer, or deviate from the Single Instruction-Multiple Data design paradigm.

These objects are satisfied by the present invention, which, according to one exemplary embodiment, comprises an apparatus including a rectangular array of processing elements (PEs) and a controller. The apparatus offers a number of techniques for shifting image data within the array. A first technique, the ROLL option, simultaneously shifts image planes in opposite directions within the array, in a manner analogous to the rolling tread of a tank. A second technique, the gated shift option, makes a normal shift of an image plane to neighboring PEs conditional, for each PE, upon a value stored in a mask register of each PE. A third technique, the carry propagate option, combines the computations from multiple selected PEs in order to complete an n-bit operation in fewer than n clocks by forming "supercells" within the array.

The apparatus also includes a multi-bit X Pattern register and a multi-bit Y Pattern register. These registers have bit values corresponding to respective columns (for the X Pattern register) and rows (for the Y Pattern register) of the array. Patterns can be propagated from these registers into corresponding rows and columns. Further, these registers can be used to receive values representing the logical OR of signals generated by individual PEs within respective rows and columns of the array.

Finally, a number of global data controllers containing registers are used to store information which can be broadcast into the processing array. These controllers include a 4Q Controller including four quadrant registers which propagate four scalar values into four respective quadrants of the array. Broadcasting, in this case, is accomplishing by overlaying the scalar values on command information which is supplied to the processing array.

BRIEF DESCRIPTION OF THE DRAWINGS

The above-mentioned exemplary objects and advantages of the invention will be understood by reading the following detailed description in conjunction with the drawings in which:

FIGS. 8A, 8B and 8C together show an exemplary application of the ROLL operation.

DETAILED DESCRIPTION

Figure 1:
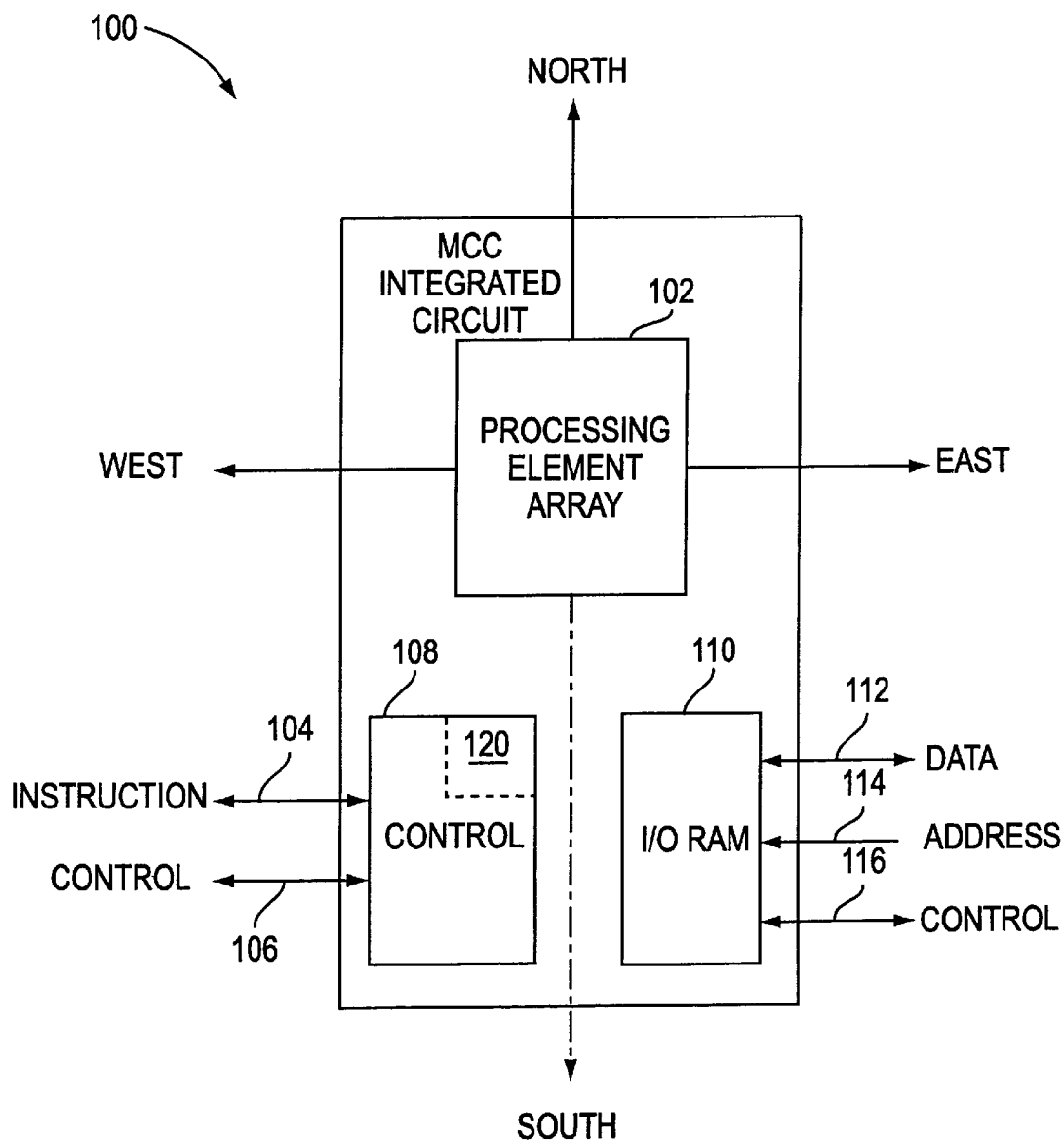
FIG. 1 is a high level block diagram of an exemplary Mesh Connected Computer (MCC) in accordance with one aspect of the invention.

The various features of the invention will now be described with respect to the figures, in which like parts are identified with the same reference characters.

In one exemplary embodiment, the present invention can be implemented on the Mesh Connected Computer disclosed in the above-mentioned co-pending application, U.S. application Ser. No. 09/057,468 (our reference No. 017750-351). However, the invention disclosed herein can be used with other types of parallel processors, particularly those processors using the SIMD (Single Instruction-Multiple Data) design architecture.

In one exemplary embodiment, the Mesh Connected Computer (MCC) is implemented as a single integrated circuit, but the functions described herein can also be implemented in discrete processing modules (e.g., by separate processing modules connected to a circuit board substrate).

In the following description, lowercase symbols (e.g., pe_glor) generally denote signals pertaining to an individual processing element (PE), while uppercase symbols generally denote signals pertaining to the PE array or chip as a whole (e.g., CHIP_GLOR), or signals pertaining to a group of PEs (e.g., from a PE Group, or "PEG").

The terms "image" and "image plane" are used broadly throughout this specification to refer not only to pictures produced by sensing electromagnetic radiation, but also to any collection of data.

1. Overview of the Mesh Connected Computer

FIG. 1 is a high level block diagram of an exemplary Mesh Connected Computer (MCC) 100. As shown there, the MCC 100 includes a processing element (PE) array 102 communicatively connected to a controller 108 and an I/O RAM 110. An overview of each of these units appears below. A more detailed discussion of these units is provided in later sections.

Figure 3:
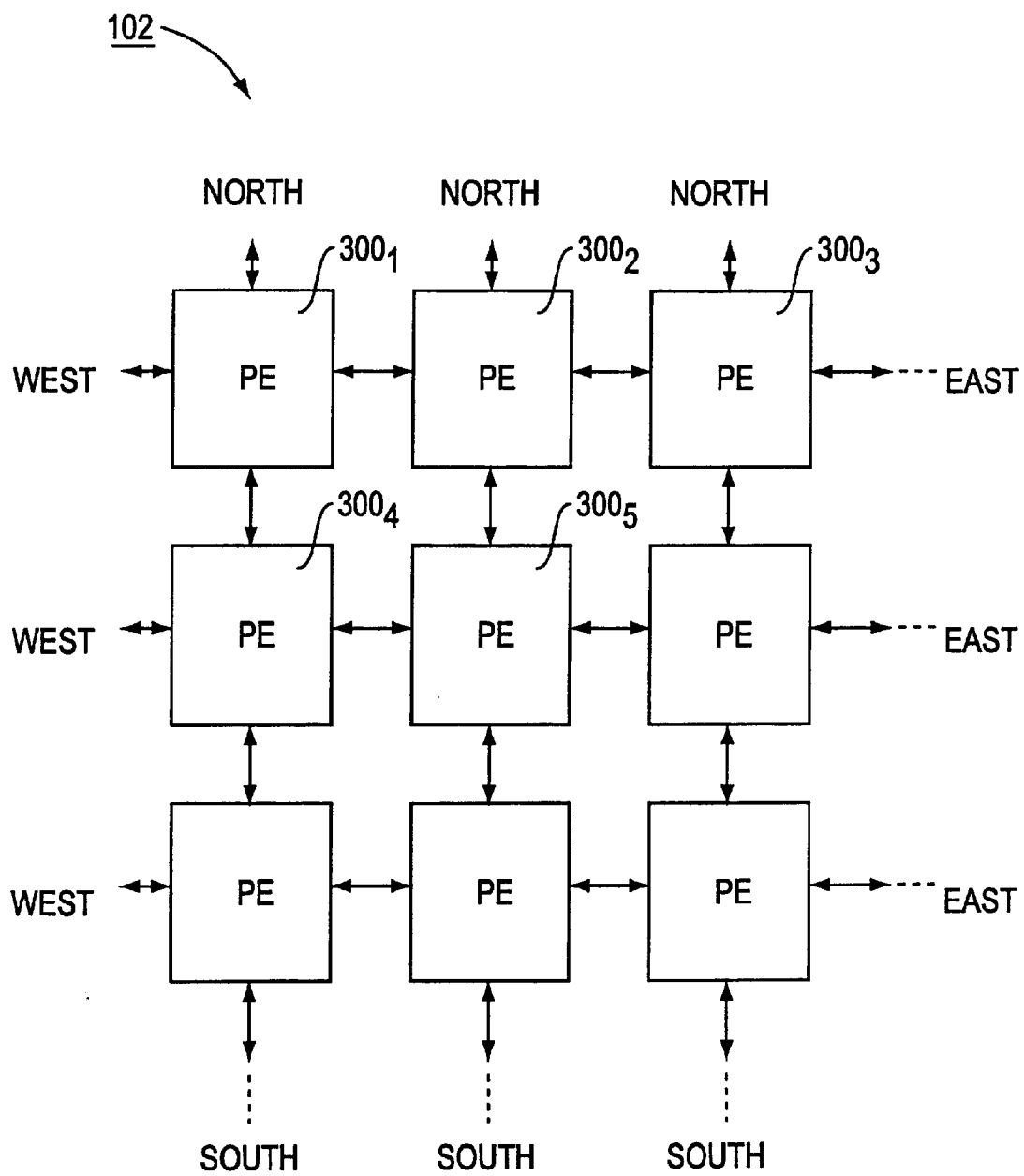
FIG. 3 is a high level block diagram of a portion of the processing element (PE) array.

The heart of processing within the MCC 100 is the PE array 102, a portion of which is shown in FIG. 3. In one embodiment, the PE array 102 is a 32×32 array of PEs 300 (such as PEs $300_1$, $300_2$, $300_3$, $300_4$ and $300_5$), although those skilled in the art will appreciate that larger or smaller arrays can be used depending on the objectives of the system designer. PEs 300 which are located in the interior of the array have four neighbors to their north (N), south (S), east (E) and west (W). PE input signals from north, south, east and west neighbors are denoted by "ni", "si", "ei" and "wi", respectively. Output signals generated by a PE 300 to its neighbors are correspondingly denoted by signals "no", "so", "eo", and "wo".

Figure 4:
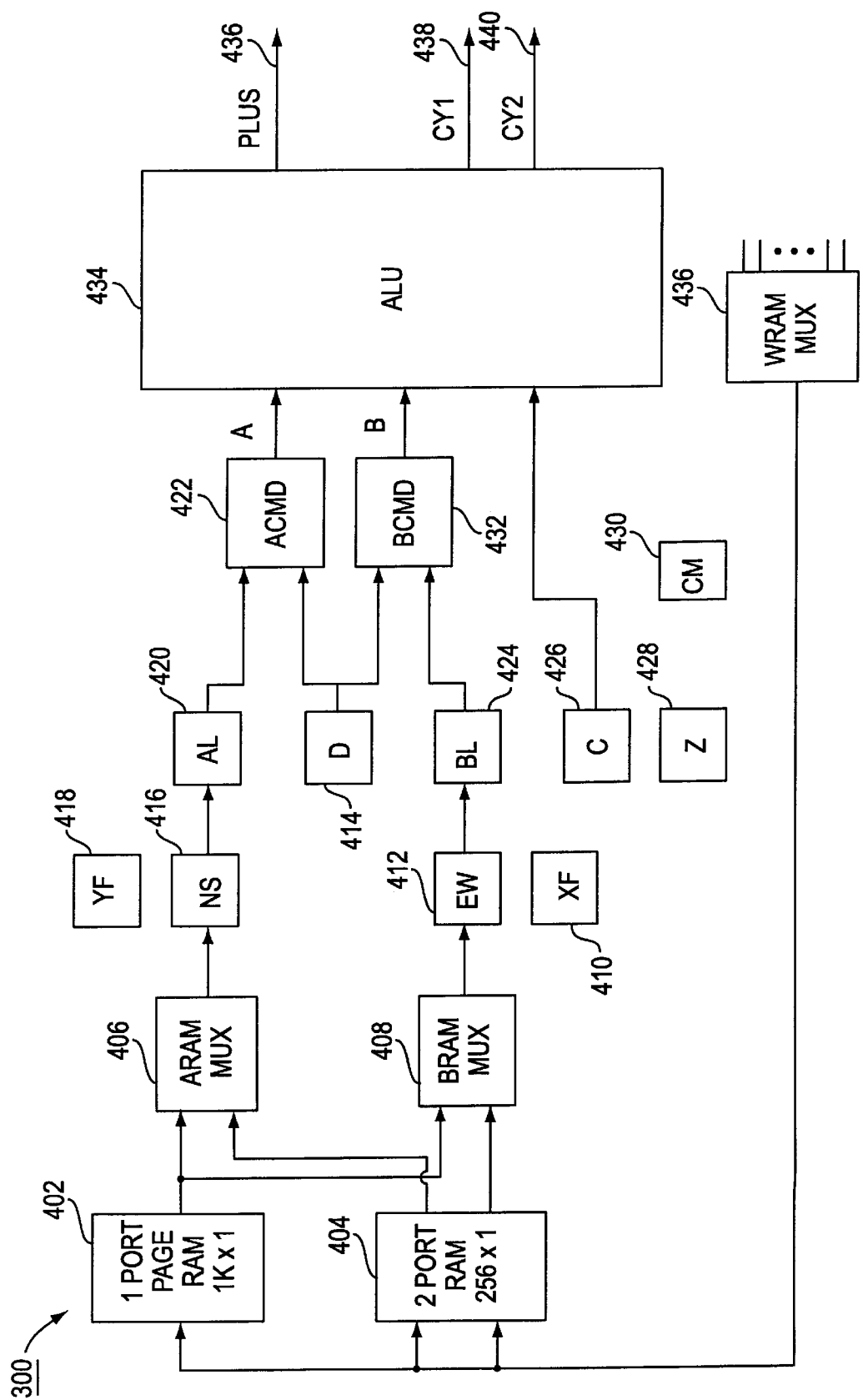
FIG. 4 is a block diagram of the internal resources of an exemplary individual PE in accordance with one aspect of the invention.

Each PE 300 includes a north-south register "ns" and an east-west register "ew" (shown in FIGS. 4 and 5). When the PEs 300 are properly instructed, the ns and ew registers can provide shift plane translation to align neighboring operands for computation, if necessary. The term "shift plane translation" means the movement of data from one PE 300 to another. Because of the SIMD architecture, it is generally the case that if one PE 300 is shifting data to another PE 300, then all PEs 300 are performing the same type of shift in the same direction. Thus, a "plane" of data is being shifted.

Those PEs 300 located on the periphery of the array lack one or more neighbors. These PEs 300 may pass information to neighboring chips, which, in turn, include their own PE arrays 102. More specifically, Table 1 below identifies the signals which link neighboring chips.

TABLE 1

| Signal | I/O | Description |
| --- | --- | --- |
| N(0:31) | I/O | North PE boundary bi-directional interface. |
| NO- | O | North Out indicator. A logic low indicates the next clock cycle will be an output from the N(0:31) signals. |
| S(0:31) | I/O | South PE boundary bi-directional interface. |
| SI- | I | South In indicator. A logic low indicates the next clock cycle will be an output from the adjacent MCC's N(0:31) |
| E(0:31) | I/O | East PE boundary bi-directional interface. |
| EO- | O | East Out indicator. A logic low indicates the next clock cycle will be an output from the E(0:31) signals. |
| W(0:31) | I/O | West PE boundary bi-directional interface. |
| WI- | I | West In indicator. A logic low indicates the next clock cycle will be an output from the adjacent MCC's E(0:31) |

Each PE is capable of processing 1-bit operands per clock using a PE arithmetic logic unit (ALU). According to one embodiment, these operands may comprise image data comprising a plurality of pixels. The image data is stored in the array as a collection of bit planes, where each bit plane is an array of bit values. Accordingly, an "n" bit image is implemented as "n" bit planes. Each PE 300 may contain all of the bit values for a single pixel of the image. However, the PEs 300 process the image data as a series of bitplane operations.

The input/output random access memory (I/O RAM) 110 shown in FIG. 1 is used to hold data that is to be moved into or out of the MCC 100. Associated with the I/O RAM 110 are various data signals 112, address signals 114 and control signals 116 that enable the MCC 100 to be viewed as an addressable resource by hardware that is external to the MCC 100.

Image data can be transferred between the I/O RAM 110 and the processing array 102 via a CM plane (not shown in FIG. 1). More specifically, input data can be loaded into PEs 300 located at an entry point to the array 102 via the CM plane, and then shifted from PE to PE within the CM plane to propagate the data into the array 102. Each PE contains a cm register (shown in FIG. 5C as register 430), which is used to propagate image data from one PE to the next neighboring PE.

The CM plane may shift data at any time without disturbing PE 300 operation (e.g., without disturbing computations performed by the PE). Also, the input and output of information from the array 102 using the CM plane may be performed independently of shifts in operands (e.g., image data) between the PEs 300.

The controller 108 generally coordinates the operation of the various resources of the MCC 100 so that the various actions specified by instructions 104 and other control signals 106 supplied to the MCC 100 will be carried out. More specifically, the controller 108 provides microprogrammed instructions in the form of a series of command words to control each PE 300. All PEs 300 receive the same instruction, although the PEs may contain different operands (e.g., different stored data which is acted upon by the instruction). As described in the BACKGROUND section, this type of arrangement is known in the art as a Single Instruction-Multiple Data (SIMD) architecture. A series of command words to perform a particular basic task is referred to as a "primitive".

The controller 108 includes "GLOR" (Global OR) and pattern generation logic 120. As described more fully in Section No. 6 below, the GLOR logic inputs and outputs various global values to and from the PE array 102. For instance, each PE generates a "pe_glor" signal. These signals may be "OR-ed" together to generate a CHIP_GLOR signal, which can be used to extract the value stored by a particular PE 300. The GLOR and pattern generation logic 120 can also be used to globally broadcast information back to the array 102. Other global signals include overflow (OVER), column global OR (COL_GLOR), row global OR (ROW_GLOR), and quadrant global OR (QUAD_GLOR).

2. Exemplary Array Interface Structure

Figure 2:
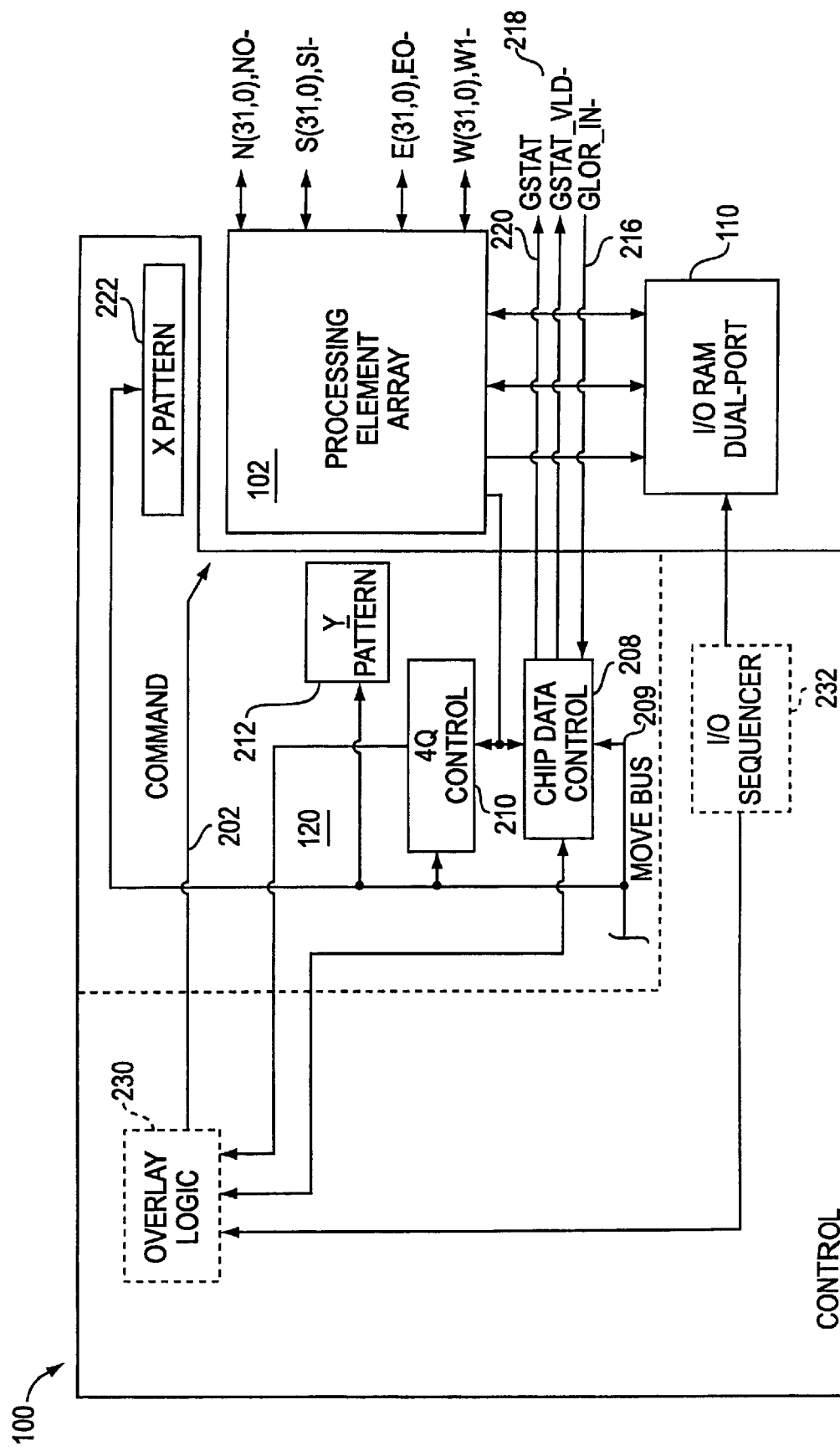
FIG. 2 is a more detailed block diagram of the Mesh Connected Computer (MCC) shown in FIG. 1.

FIG. 2 is another block diagram of the MCC 100, showing the GLOR and pattern generation logic 120 in greater detail.

As described above, the controller 108 generally coordinates the operation of the various resources of the MCC 100 so that the various actions specified by instructions will be carried out by the array 102. More specifically, overlay logic 230, in conjunction with other command generation units (not shown), formulates commands 202 comprising a series of command words. All PEs 300 receive the same instruction, although the PEs may contain different operands (e.g., different stored data which is acted upon by the instruction). The command words may also be overlaid with data, such as data received from the 4Q Controller 210. In this manner, the data can be broadcast into the array. The above-mentioned U.S. application Ser. No. 09/057,468 (our reference No. 017750-351) provides additional details pertaining to the controller. The details of this controller have been omitted so as not to obfuscate the disclosure of the present specification.

According to exemplary embodiments, the command word is thirty-five bits long. The command word is divided into sixteen command fields. Of the sixteen command fields, eleven are devoted to controlling signal selection for various registers used in each PE (to be discussed in greater detail below). More specifically, a plurality of multiplexors provide the selection of signals by choosing between a plurality of input signals in accordance with information contained within the command word. Another collection of fields within the command word is devoted to controlling various PE operations, such as the operations performed by each PE's ALU unit. One of these fields controls the ROLL shift plane operation, by selecting whether the ROLL operation is active or inactive (to be discussed in greater detail below). Of course, those skilled in the art will appreciate that the size, organization and contents of the command word are exemplary.

As mentioned, the I/O RAM 110 is provided to hold data (e.g., image data) that is to be moved into or out of the MCC 100. In particular, the I/O RAM 110 supplies operands to, and receives results from, the PE array 102. To facilitate access not only by the PE array 102 but also the external memory interface of the MCC 100, the I/O RAM 110 is preferably a 2-port memory. In the exemplary embodiment, the I/O RAM 110 has 2K of addressable storage locations (where 1K=1024), each location being 64 bits wide.

The I/O RAM 110 is coupled to the PE array 102 through the above-mentioned communications (CM) plane. In one exemplary embodiment, the CM plane is not directly accessible from the external interface to the MCC 100.

The I/O RAM 110 is also connected to a DMA address base register (not shown) and an I/O sequencer 232. The DMA base register provides I/O RAM addresses for all DMA accesses on the memory bus. Among other functions, the I/O sequencer 232 generates control signals for moving data into and out of the MCC 100. More specifically, the I/O sequencer can move an image from I/O RAM 110 to the PE array 102 via the CM plane, or from the PE array 102 to the I/O RAM 110 via the CM plane. In one aspect of the invention, various units of the controller 108 and the I/O sequencer operate concurrently. For instance, in one embodiment, the PE array 102 is capable of processing data (under the control of PE instructions generated by the controller 108) while, at the same time, data is being moved into or out of the PE array 102 (from or to the I/O RAM 110), and into or out of the I/O RAM 110 from the external memory interface.

The Y Pattern register 212 and X Pattern register 222 are 32-bit registers associated with the 32 rows and 32 columns, respectively, of the PE array 102. In one application, these registers are used to propagate patterns into ns and ew registers (to be described in greater detail below) of each PE element 300. In another embodiment, these registers 222, 212 are used to receive global OR signals from respective rows and/or columns of the PE array 102. When the Y Pattern and X Pattern registers 212, 222 receive these global OR signals, they can then rebroadcast this information back into the array 102. In one embodiment, the Y Pattern and X Pattern registers 222, 212 can be loaded via the Move Bus 209.

The 4Q Controller 210 includes four controllers (to be described in greater detail below) associated with four quadrants of the array 102. For instance, in the exemplary case of a 32×32 array, there are four 16×16 quadrants. A first controller (NWQ Controller 652 shown in FIG. 6) contains a register which stores information pertaining to the north-west quadrant, the second controller (NEQ Controller 654) contains a register which stores information pertaining to the north-east quadrant, the third controller (SWQ Controller 656) contains a register which stores information pertaining to the south-west quadrant, and a fourth controller (SEQ Controller 658) contains a register which stores information pertaining to the south-east quadrant. The values stored in the registers of the quadrant controllers can be overlaid on a command word by the overlay logic 230 and broadcast to the respective quadrants at the same time. Thus, for instance, each PE in the north-west quadrant can globally receive the broadcast value in the register of the NWQ Controller 652.

The CHIP DATA Controller 208 contains a register which can be used to store information pertaining to the global OR value of all PEs 300 in the array 102, or in other words, the global OR value of the chip as a whole (i.e., CHIP_GLOR). The CHIP_GLOR signal supplied at an output of an OR gate 648 can also be output using the GSTAT (global status) output line 220. The GSTAT_VLD (global valid) signal line 218 indicates whether there is valid GSTAT data or the GSTAT line 220. Also, the CHIP DATA Controller 208 can be used to receive information via the GLOR_IN signal 216. This information can be used by the command generation logic 230 of the controller 108 as a global bit plane operand for broadcast into the array 102.

Additional details regarding the above-described units will be provided in the following sections.

3. Exemplary PE Structure

Figure 5A:
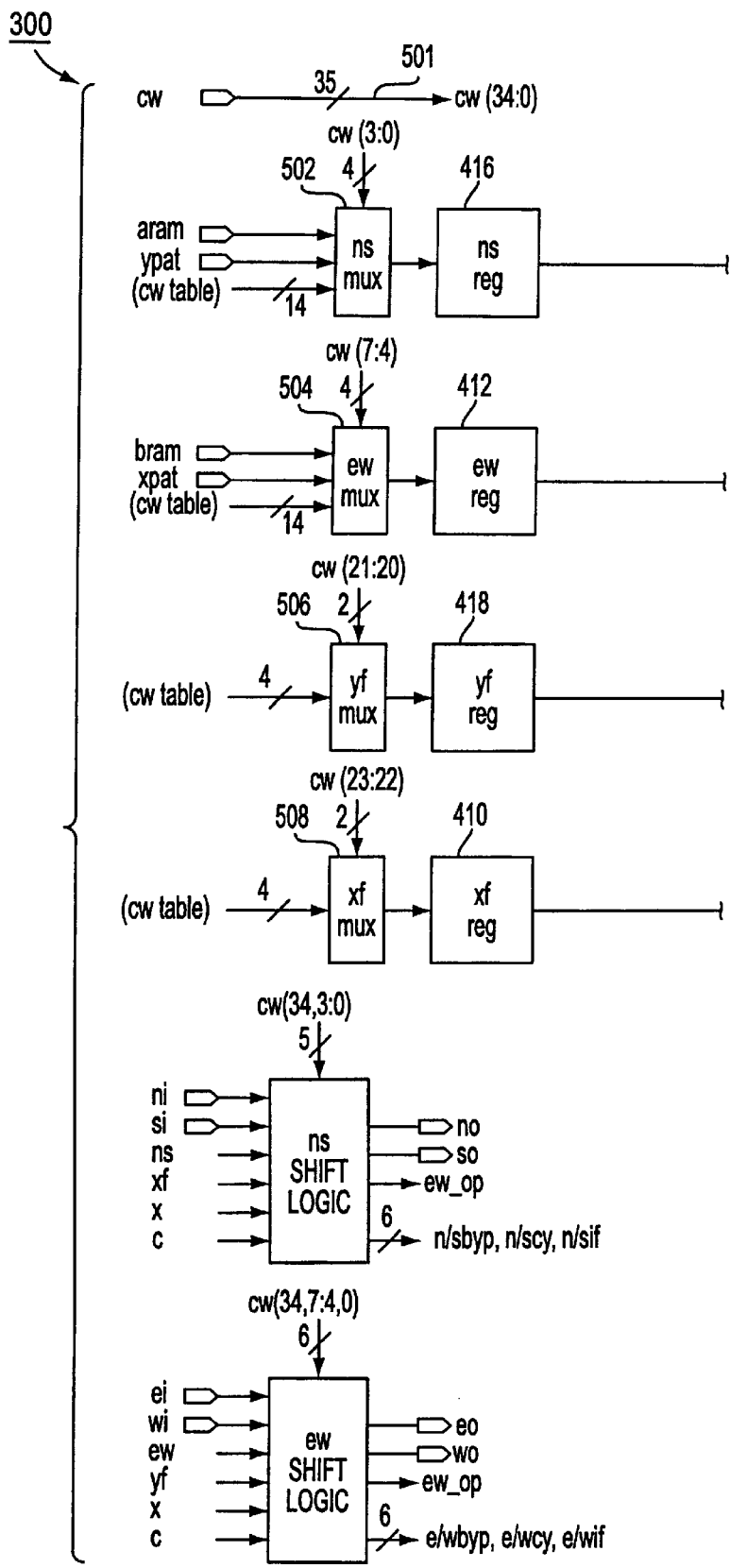
FIGS. 5A, 5B and 5C together are a block diagram depicting the exemplary PE shown in FIG. 4 in a greater level of detail.
Figure 5B:
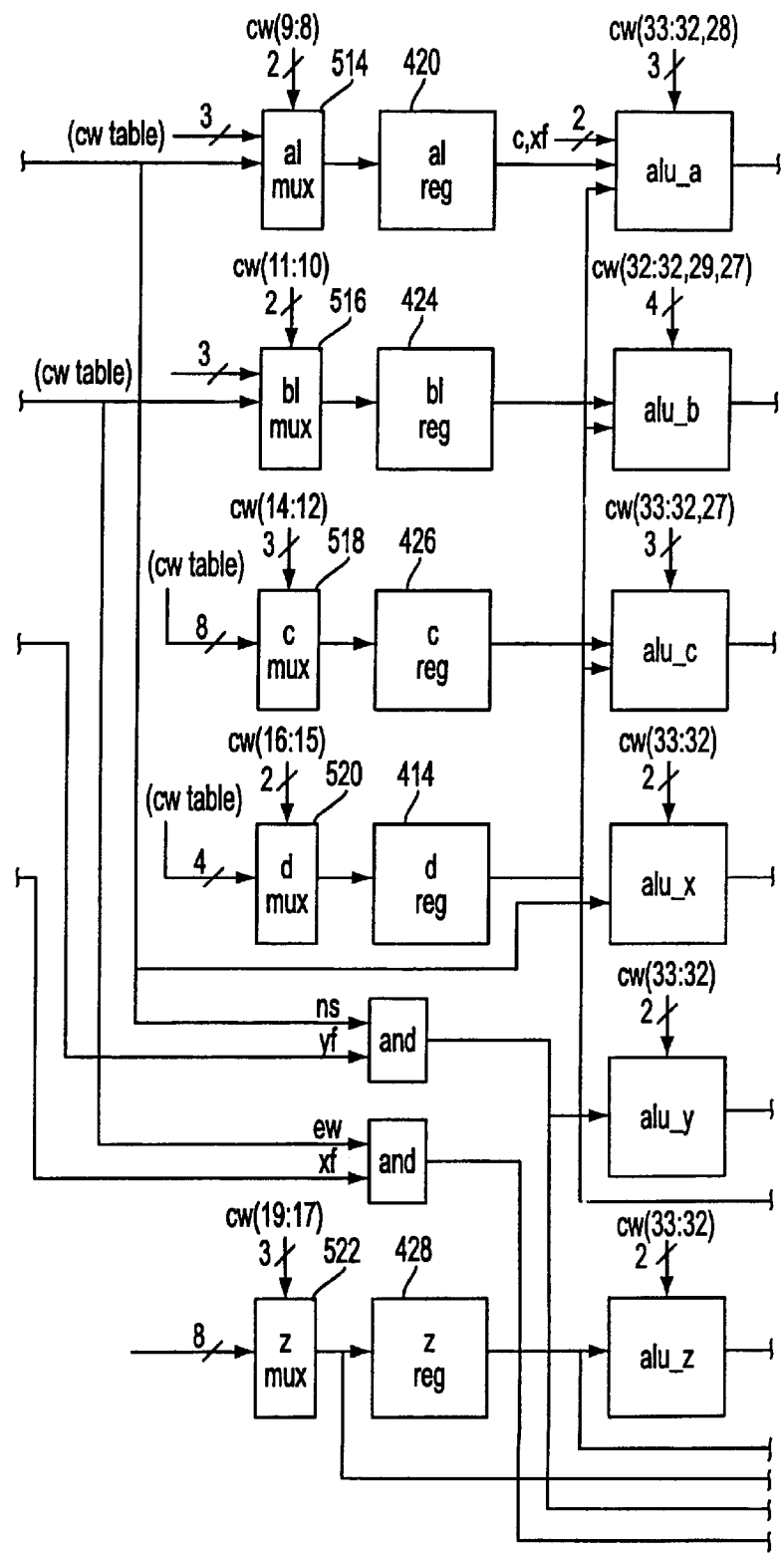
Figure 5C:
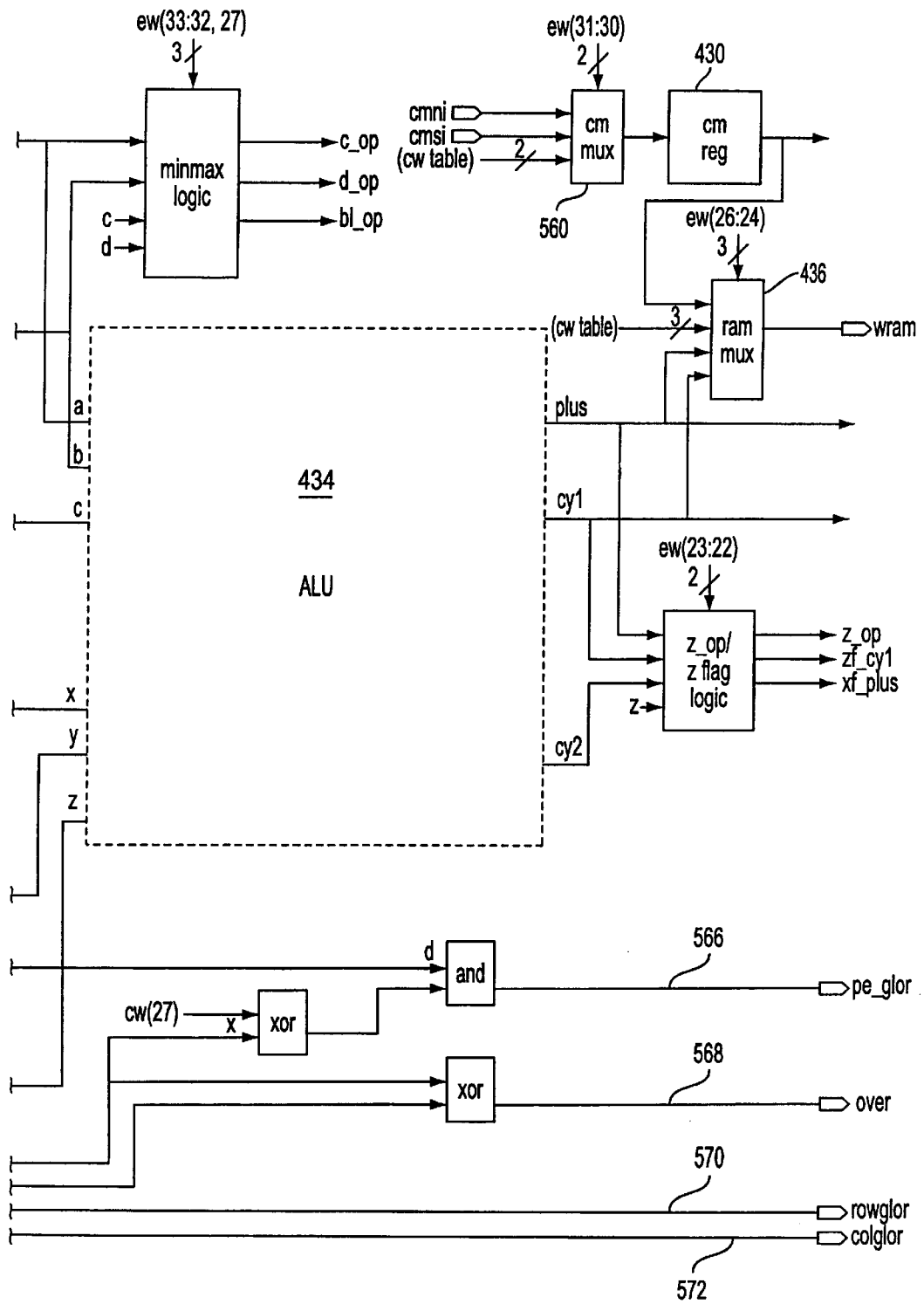

The internal resources of an exemplary PE 300 are shown in FIG. 4. Because of the complexity of the interconnections, FIG. 4 primarily illustrates an overview of the types of resources and fundamental interconnections in a PE 300. FIGS. 5A, 5B and 5C together are a block diagram depicting the PE 300 at a higher level of detail. Once again, the interested reader is referred to U.S. application Ser. No. 09/057,468 (our reference No. 017750-351), which provides further details pertaining to the structure and function of PE 300. However, the present invention is not limited to the specific type of PE structure described in the above-referenced application.

Each PE 300 in the PE array 102 includes two addressable memories: a 2-port PE RAM 404 and a 1-port Page Ram 402. In the exemplary embodiment, each PE's 2-port PE RAM 404 has 256 addressable storage locations, each 1 bit wide. Each PE's 1 port PAGE RAM 402 has 1024 addressable storage locations, each 1 bit wide. Because the exemplary PE array 102 has 1024 PEs (i.e., 32×32), the total size of the MCC's 2-port PE RAM 404 is 256×1024, and the total size of the MCC's 1 port PAGE RAM 402 is 1024×1024.

The PE 300 also includes ten registers in the exemplary embodiment shown in FIGS. 4 and 5. The "ns" and "ew" registers, 416 and 412, respectively, comprise north-south and east-west registers. The "al" and "bl" registers, 420 and 424, respectively, comprise "a" and "b" latch registers. The "c" register 426 is a carry propagate register, while the "d" register 414 is a mask register. The z register 428 is a zero propagate register. The "cm" register 430 is a bit plane I/O register. The "xf" and "yf" registers, 410 and 418, respectively, comprise an ew shift activity register and ns shift activity register, respectively.

The ns and ew registers, 416 and 412, respectively, are used to receive bit plane values for shifting in the north-south and east-west directions, respectively (except in the case of the ROLL function, described below). The al and bl registers, 420 and 424, respectively, may accept bit values from the ns and ew registers 416, 412 while the ns and ew registers load the next operand planes. The al and bl registers, as well as the c register 426, supply operand inputs to the ALU 434 for computation. The results of the computation may be written to either the PE RAM 404 or the Page Ram 402, and/or propagated to the c register 426 and z register 428 for use in the next bit operation. The d register 414, xf register 410, and yf register 418 provide bit plane masks which contribute to the functioning of the ALU 434. The cm register 430 is used to shift information in the CM plane in the course of performing I/O.

The acmd logic block 422 permits various operations to be performed between the contents of the al register 420 and the d register 414, the results of which are supplied as the "a" input to the ALU 434. Similarly, the bcmd logic block 432 permits various operations to be performed between the contents of the bl register 424 and the d register 414, the results of which are supplied as the "b" input to the ALU 434.

Each PE 300 further includes a number of multiplexors associated with these registers, including a ns mux 502, ew mux 504, yf mux 506, xf mux 508, al mux 514, bl mux 516, c mux 518, d mux 520, z mux 522, ram mux 436, and cm mux 560. U.S. application Ser. No. 09/057,468 (our reference No. 017750-351) provides tables which indicate how, in one exemplary embodiment, different fields of the command word can be used to control the switching function of the above-identified multiplexors. That disclosure also includes tables which indicate how other fields of the command word are used to govern the operation of the ALU 434. Accordingly, those tables fully define the functionality of the PE unit 300.

Each PE 300 also contributes to a number of global output signals including pe_glor 566, row_glor 570, col_glor 572 and over 568. The pe_glor signal 566 is logically OR-ed with the pe_glor signals of other PEs 300 to produce a global CHIP_GLOR signal. Each PE's row_glor and col_glor signals, 570 and 572, respectively, are logically OR-ed with like signals from other PEs located in the same respective row and column to produce the ROW_GLOR and COL_GLOR signals, respectively. The row_glor signal 570 is defined as the logical AND (&) of the ns and yf registers, 416 and 506. The col_glor signal 572 is defined as the logical AND (&) of the ew and xf registers, 412 and 508. The pe_glor signal 566 is defined as (z ^ op_cmd) & d, where "^" denotes logical XOR, z denotes the contents of the z register 428, d denotes the contents of the d register 414, and op_cmd is a particular bit in the command word. When op_cmd=1, the value of the z register 428 is inverted before masking and contributing to CHIP_GLOR. This allows a global NAND in addition to global OR, thereby providing occurrence-of-0 detection.

In summary, Table 2 identifies the various input and output signals pertaining to an individual PE 300.

TABLE 2

| Name | Bits | In/out | Description |
|---|---|---|---|
| ni | 1 | in | signal from north neighbor |
| si | 1 | in | signal from south neighbor |
| ei | 1 | in | signal from east neighbor |
| wi | 1 | in | signal from west neighbor |
| no | 1 | out | signal to north neighbor |
| so | 1 | out | signal to south neighbor |
| eo | 1 | out | signal to east neighbor |
| wo | 1 | out | signal to west neighbor |
| cmsi | 1 | in | CM plane south input |
| cmni | 1 | in | CM plane north input |
| cmso | 1 | out | CM plane south output |
| cmno | 1 | out | CM plane north output |
| cw | 35 | in | command word |
| over | 1 | out | pe overflow output |
| pe_glor | 1 | out | pe glor output |
| row_glor | 1 | out | pe glor output |
| col_glor | 1 | out | pe glor output |
| y_pat | 1 | in | Y pattern register input |
| x_pat | 1 | in | X pattern register input |
| A_RAM | 1 | in | memory port a read data |
| B_RAM | 1 | in | memory port b read data |
| W_RAM | 1 | out | memory port w write data |

4. Exemplary IC Implementation

As mentioned above, the MCC 100 can be implemented using discrete components or as a single IC chip. One exemplary feature of the design of an MCC chip is the organization of the chip into functional blocks and the layout of those blocks on the die. It is generally desirable to keep signal routing to a minimum so that the least die space and power is "wasted" on signal runs. Other factors, such as critical path signals, chip boundary signals, and placement of memories also come into play.

In the exemplary embodiment, the MCC IC 100 is organized so that the PE array 102 is divided into four quadrants, with each quadrant being situated in a corner of the device. The quadrants are spaced so that there is room for logic along the horizontal and vertical axes of the chip. The horizontal axis is used for the I/O RAM memories 110, and the vertical axis is used for the sequencing logic (e.g., instruction sequencer and primitive sequencer, which are not shown, but disclosed in the copending U.S. application Ser. No. 09/057,468 (our reference No. 017750-351)).

Figure 6A:
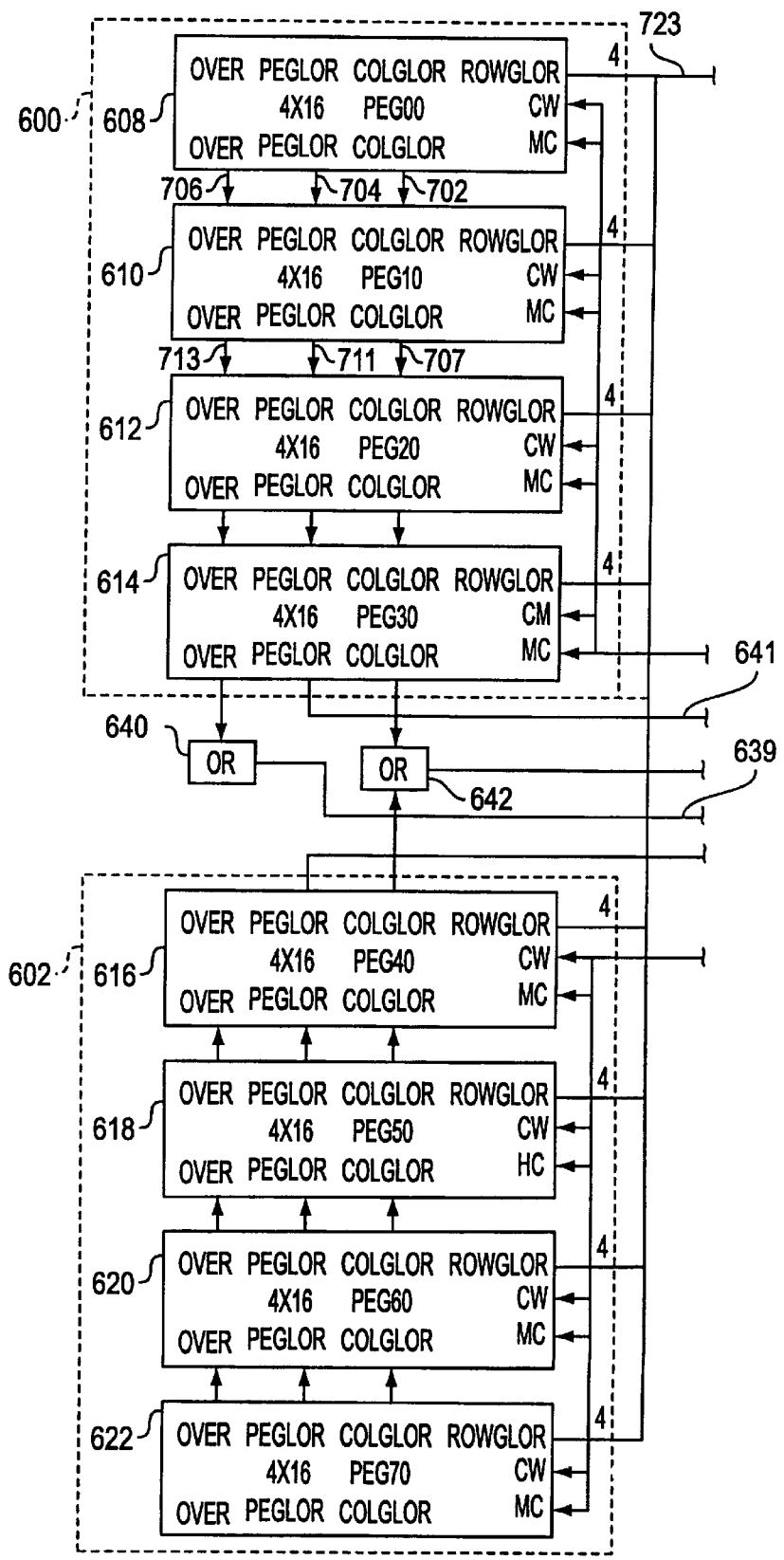
FIGS. 6A, 6B and 6C together show an exemplary layout of the MCC chip comprising four quadrants, each including four 4×16 PE groups (PEGs)
Figure 6B:
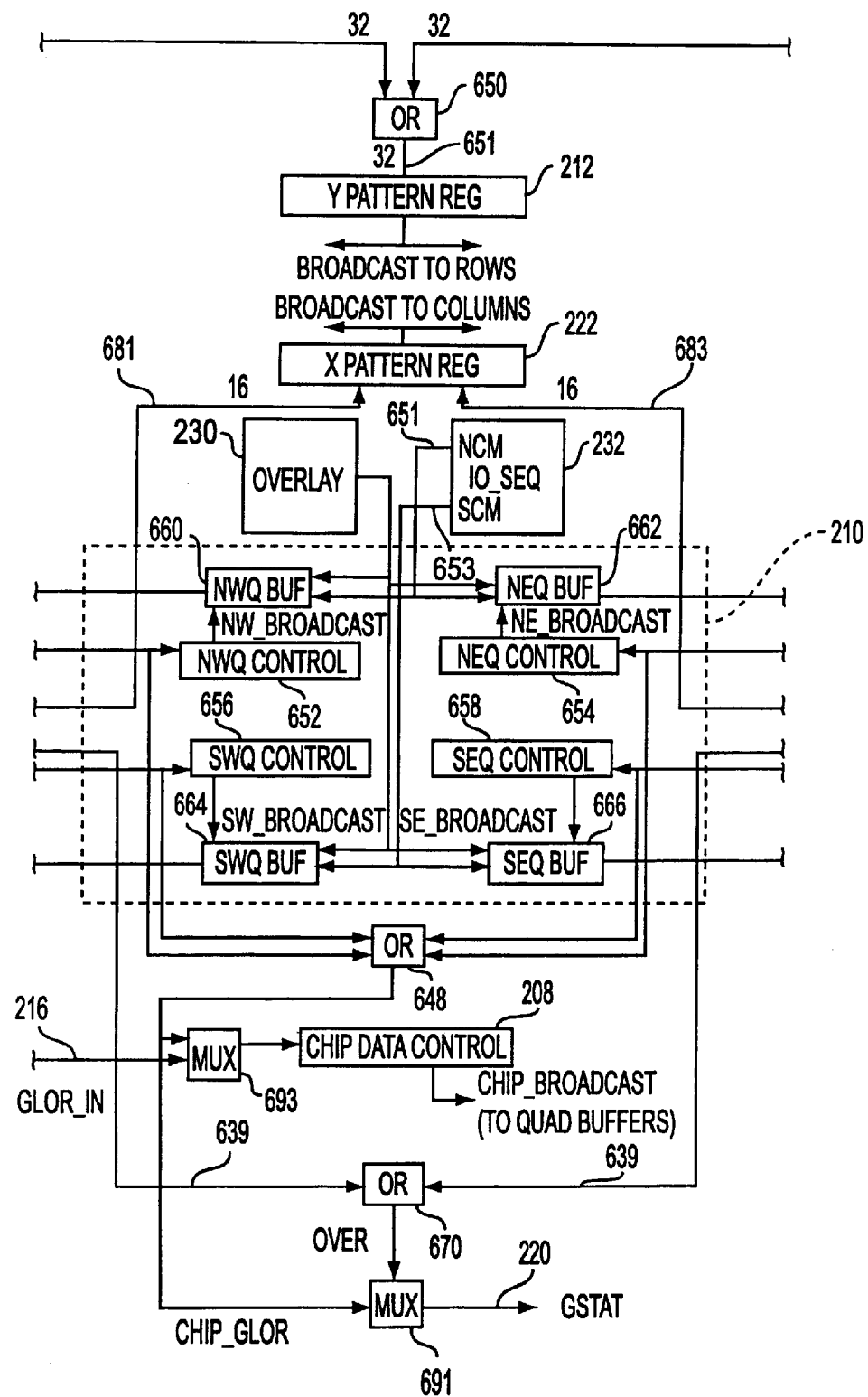
Figure 6C:
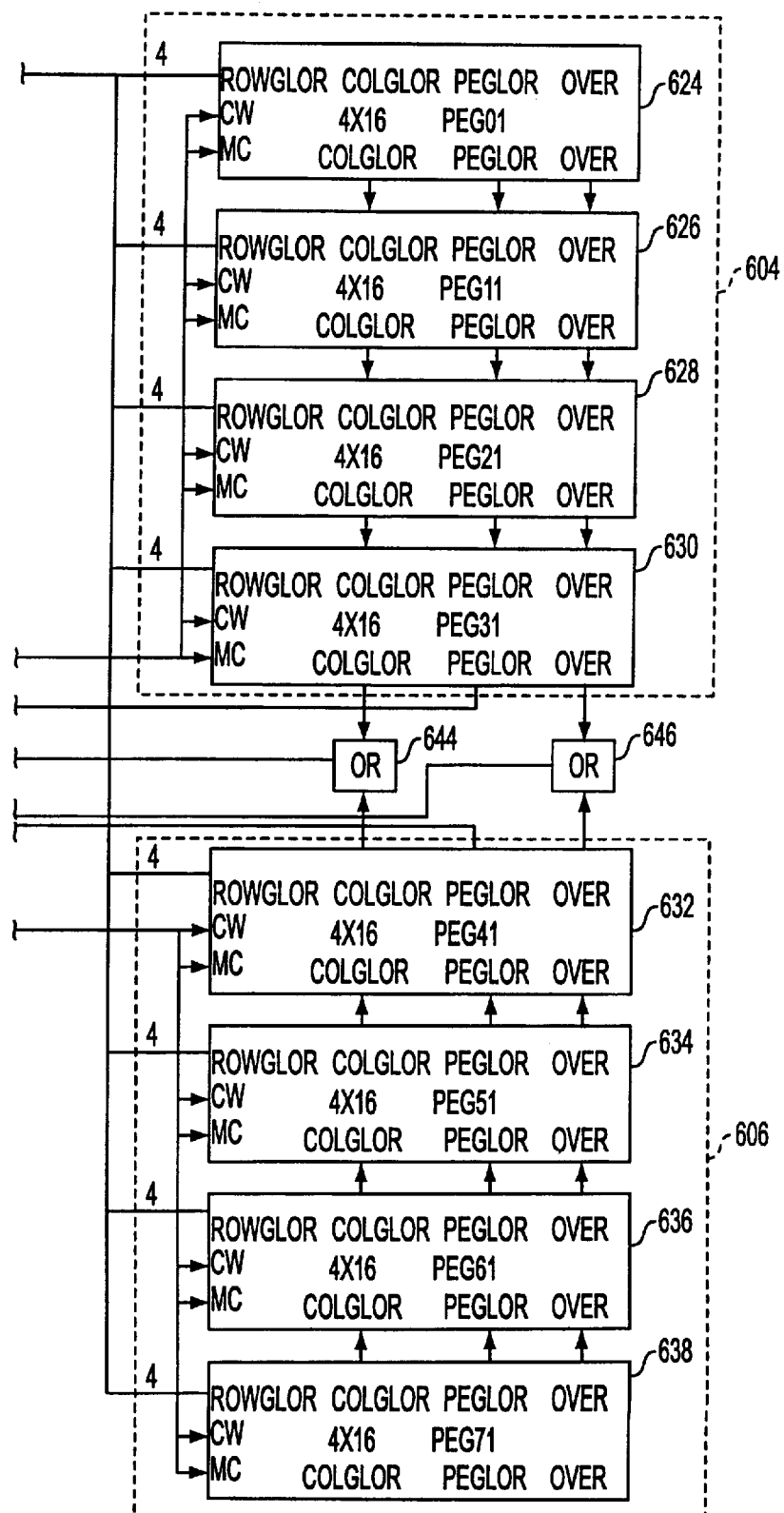
Figure 7A:
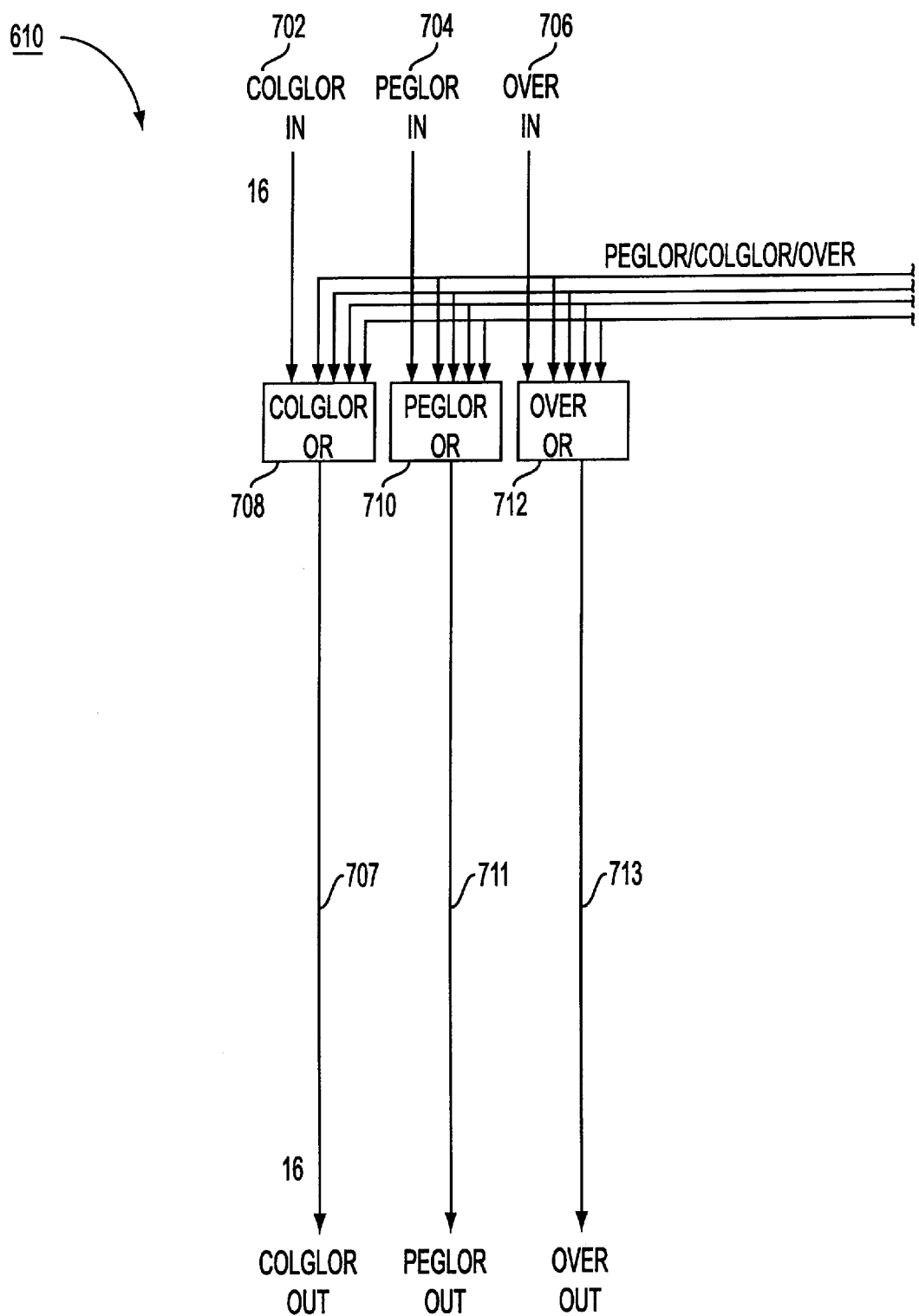
FIGS. 7A, 7B and 7C together show an exemplary layout of one of the 4×16 PEG units shown in FIGS. 6A and 6C.
Figure 7B:
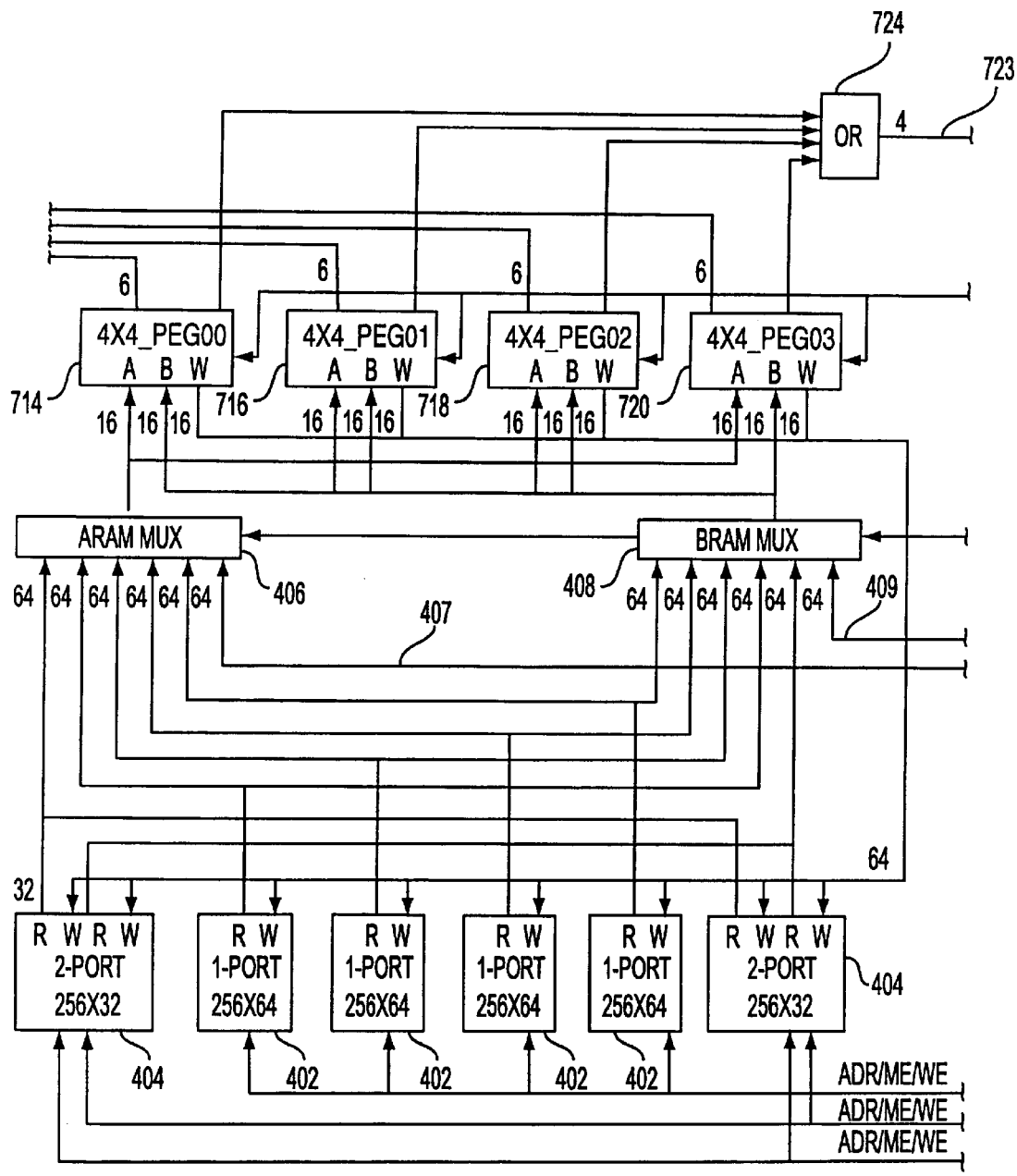
Figure 7C:
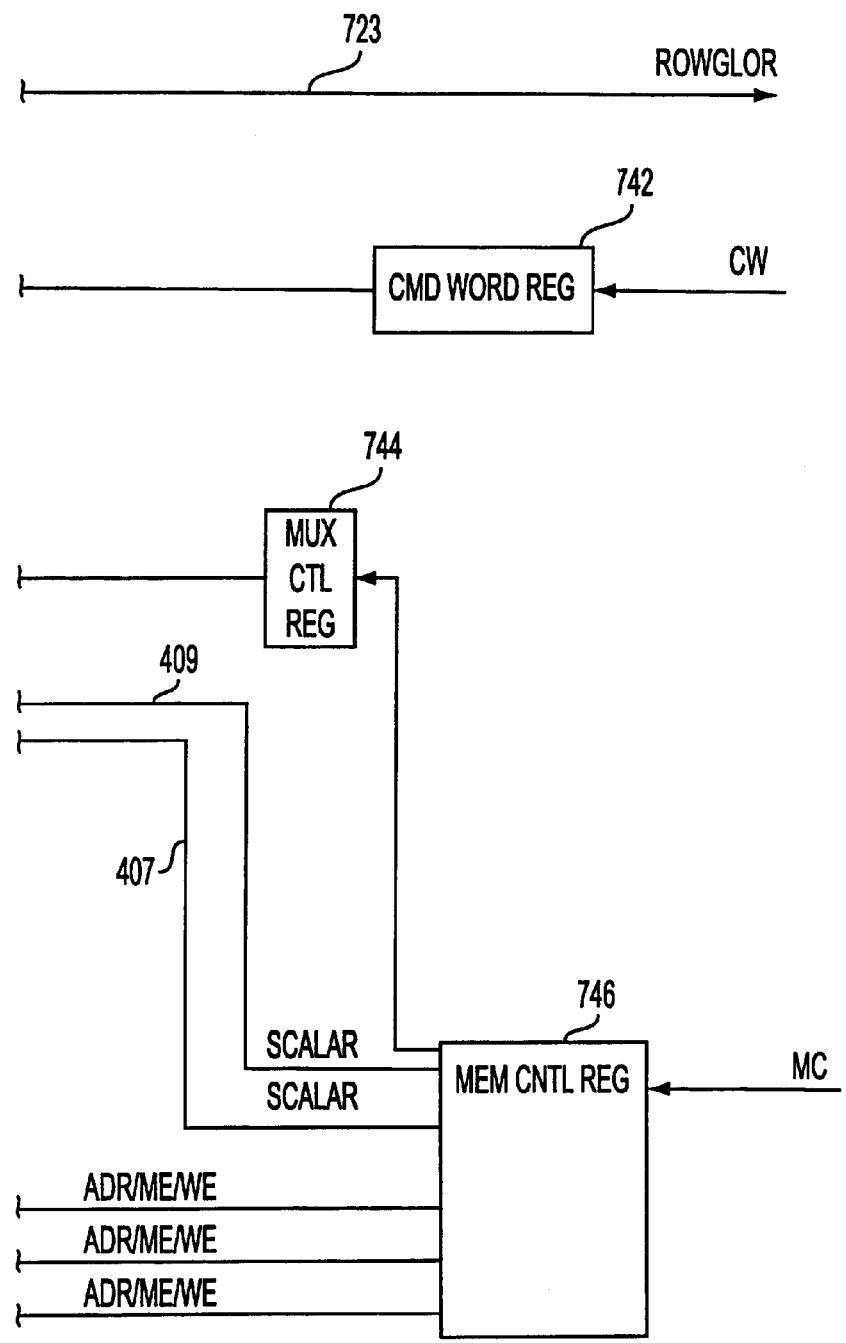

FIGS. 6A, 6B and 6C together show an exemplary configuration of the physical layout just described. The layout employs a modular organization of PEs. As mentioned, the array of PEs is divided into four quadrants, comprising a north-west quadrant 600, a south-west quadrant 602, a north-east quadrant 604 and a south-east quadrant 606. Each quadrant is subdivided into 4×16 PE Groups (PEGs) (e.g., PEGs 608 to 638). Each 4×16 PEG, in turn, is further subdivided into 4×4 PE groups (e.g. PEGs 714 to 720), as shown in FIGS. 7A, 7B and 7C, which show the layout of the exemplary PEG 610 (which was arbitrarily selected for the purpose of this discussion). In FIG. 6A, only the input/output signals for the 4×16 PEG 610 have been labeled, so as not to unnecessarily clutter the figures. However, the reader should note that all of the 4×16 PEGs have a similar construction and signal interface to PEG 610.

The central portion of the chip (shown in FIG. 6B) comprises the "command center" of the chip. More specifically, the central portion of the chip includes the 4Q Controller 210, which includes a north-west controller (NWQ Controller 652), north-east controller (NEQ Controller 654), south-west controller (SWQ Controller 656), and south-east controller (SEQ Controller 658). Each of these controllers includes a register (e.g., the NWQ, NEQ, SWQ, and SEQ Registers, not shown in FIG. 6). Each of the controllers also has a buffer associated therewith (e.g., the NWQ Buffer 660, NEQ Buffer 662, SWQ Buffer 664 and SEQ Buffer 666).

The 4Q Controller 210 includes the logic for broadcasting commands into the array. More specifically, the commands generated by the overlay logic 230 are distributed to the four quadrant buffers: NWQ Buffer 660, NEQ Buffer 662, SWQ Buffer 664 and SEQ Buffer 666. Each of the quadrant buffers, in turn, propagates the PE command word into a respective quadrant of the chip, where it is distributed to the CW inputs of each PE group (or "PEG"). More specifically, as shown in FIG. 7C, the PE command word is supplied to a command word register 742 in each PEG, and then distributed to the 4×4 PEGs (e.g., 714, 716, 718 and 720), each of which internally supplies the PE command word to each of its PEs 300 (e.g., see the input 501 shown in FIG. 5A).

Memory control information can also be propagated into the array in the form of commands, which are distributed to the four quadrants. This memory control information is then provided to the memory control (MC) inputs of each PEG, as shown in FIGS. 6A, 6B and 6C. More specifically, the memory controls are supplied to a memory control register 746 within each PEG (as shown in FIG. 7C). The output of the memory control register 746 supplies the memory controls for the 1-port memories that constitute the PAGE RAM 402, the 2-port memories that constitute the PE RAM 404, and the ARAM and BRAM multiplexors 406, 408.

The ARAM PE signal, generated by the ARAM multiplexor 406, may supply data from one port of the PE RAM (shown as two blocks 404 in FIG. 7B), from the PAGE RAM 402, or from a scalar signal 407. Similarly, the BRAM PE signal, generated by the BRAM multiplexor 408, may supply data from the other port of the PE RAM 404, from the PAGE RAM 402, or from a scalar signal 409. The memory address (ADR), memory enable (ME) and write enable (WE) signals, together with the scalar and multiplexor control signals, provide the control for generating the PE ARAM and BRAM input signals.

The CM controls for image input and output are supplied by the I/O Sequencer 232. The signals are supplied to the quadrant buffers, with north halfplane signals 651 going to the NWQ and NEQ buffers 660, 662, and the south halfplane signals 653 going to the SWQ and SEQ buffers 664, 666. This allows individual control of each halfplane for shifting bitplane data as described in the above-mentioned U.S. application Ser. No. 09/057,468 (our reference No. 017750-351).

The exemplary layout in FIGS. 6 and 7 includes a mechanism for computing GLOR information within each PEG. This GLOR information is then combined with the GLOR information from other PEGs until, in the final combination, the GLOR value for the entire chip is provided (CHIP_GLOR). This aspect of the exemplary layout will be discussed in greater detail in Section No. 6 below.

5. Shift Plane Operations 5.1 "Normal" Shift Plane Operation

Data may be stored in each PE 300 in the ns register 416 and the ew register 412. When the PEs 300 are properly instructed, the ns and ew registers can provide shift plane translation. This allows the PE array 102 to align neighboring operands for computation in the respective ALUs 434 of each PE. "Shift plane translation" means the movement of data from one PE 300 to another. Again, because of the SIMD architecture, it is generally the case that if one PE 300 is shifting data to another PE 300, then all PEs 300 are performing the same type of shift in the same direction. Accordingly, a "plane" of data is being shifted.

As previously explained, each PE 300 in the PE array 102 is connected to anywhere from two to four PEs 300, so that data may be obtained not only from a PE's own memory resources, but also from a neighboring PE 300. A so-called "normal"shift of data from one PE 300 to another PE 300 is provided by any of the commands ns:=ni/si, ew:=ei/wi, al:=ni/si, and bl:=ei/wi. For instance, the command ns:=si indicates that the south input (si) to the PE is received into the ns register. Thus, this expression reflects a shift to the north in the NS plane. Repetitive shifts in the NS and EW planes allow the translation of data by any distance desired within the array. The AL and BL planes, on the other hand, may receive shifted data, but, according to one exemplary embodiment, may not propagate further shifts because the NS and EW planes are the sources for all bit plane shifts.

A typical application may include multiple MCCs 100, each connected to its four neighbors, to effectively form a rectangular PE array of whatever size is desired. Device boundaries are invisible to the programmer for normal shift operations. For example, a shift to the east propagates thirty-two EO signals from the PEs 300 in the east-most column of one MCC 100 to the thirty-two EI signals of the PEs 300 in the west-most column of the neighboring MCC to the east. These chip outputs are bi-directional, with a single signal pin being dedicated to each boundary PE 300, and as such, may impose some limitations which do not apply to the interior PEs 300 within the PE array 102. One limitation of the exemplary embodiment is that the boundary PEs 300 may communicate in one direction only during a given clock. This affects the ROLL operation (described below), making operation of the ROLL position dependent. A second limitation of the exemplary embodiment is that shifts in opposite directions may not occur on consecutive clocks because the drivers need time to switch. This limitation affects all shift functions (except for ROLL) and is enforced on the instruction stream (i.e., for all PEs 300) in the command generation logic 230 of the controller 108, thereby removing any position dependencies that would otherwise arise.

In addition to the normal shift operation there are several other shift plane operations which are provided, as described below.

5.2 Pattern Injection Operation

The injection of patterns into the PE array 102 is supported through the propagation of bit data values across rows (ns:=ypat) or columns (ew:=xpat). This capability is useful for controlling individual PEs 300 based upon location within the PE array 102 by, for example, supporting PE coordinate generation.

The data patterns originate in the thirty-two bit X Pattern register 222 and the thirty-two bit Y Pattern register 212. As shown in FIG. 2, these two registers are external to the PE array 102 but within the MCC 100 architecture. That is, if the MCC is implemented on a single chip, these registers could be provided as internal components of the chip.

Each bit of the X Pattern register 222 propagates data to a single (entire) column of PEs 300, and each bit of the Y Pattern register 212 propagates data to a single (entire) row of PEs 300 via the xpat and ypat input signals (e.g., see FIG. 5A). By propagating patterns into the ns and ew registers, 416 and 412, respectively, it is possible to generate a mask which selects a single PE 300, or a row, column or sub-region within the PE array 103, as will become clear in the following discussion.

Section No. 6.2 below describes, in yet further detail, how the values in the X Pattern 222 and Y Pattern 212 registers can be propagated into the columns and rows, respectively, of the array 102.

5.3 The ROLL Operation

The pattern of data movement during a ROLL operation is a loop whose end points are determined by mask values in the xf and yf registers 410, 418. For instance, in the case of a ROLL in the y direction (a north-south ROLL), the PE 300 having xf=1 (i.e., the xf register contents are equal to 1) will "roll over" the content of the ns register 416 to the ew register 412 within the same PE 300. The PE 300 having yf=1 will "roll over" the content of the ew register 412 to the ns register 416 within the same PE 300. For PEs in which the xf and yf registers are not "set" (e.g., xf=0 and yf=0), information stored in the ns register will be transferred to the north with the ns register receiving new data from the ns register to the south, and, in the same clock, information stored in the ew register will be transferred to the south with the ew register receiving new data from the ew register to the north. Thus, the ROLL operation, in the case of a north-south ROLL, redefines the ew registers as supplemental ns registers which move information in the opposite direction as the ns registers (except at the end points defined by xf=1 or yf=1). Accordingly, this pattern is analogous to a tank tread which moves in one direction on top, the opposite direction on bottom, and rolls over from top to bottom and bottom to top at the respective end points.

The ROLL operation can also proceed in the east-west direction. FIGS. 8A, 8B and 8C show one example of the ROLL operation in the east- west direction. In the initial state shown in FIG. 8A, PEs 802, 804 and 806 all have ns and ew registers set such that ns=1 and ew=0 (which is an arbitrary pattern used for the purpose of discussion). The terminal points of the loop are defined by the xf and yf registers. For this example, the yf register for PE 802 stores a value of 1 and the xf register for PE 806 stores a value of 1. The xf and yf registers for PE 804 both store a value of 0. Accordingly, after the first shift, as shown in FIG. 8B, the content of the ns register for the middle PE 804 is shifted to the east, while the content of the ew register for PE 804 is shifted to the west. The content of the ns register for PE 806 is shifted to the ew register. The content of the ew register for PE 802 is shifted to the ns register. FIG. 8C shows the result of yet another shift.

One bit of the command ROLL determines whether the ROLL operation is active or not. There are two combinations of the ROLL command: the north/south ROLL (y ROLL) and the east/west ROLL (x ROLL). When the ROLL command is active, the ROLL direction is selected by the least significant bit of another field of the command word.

The ROLL operation is unique in that it allows simultaneous propagation of data in opposite directions within the interior PEs 300 of the PE array 102. According to one exemplary embodiment, however, this is not possible across boundaries between one MCC 100 and another, so bit plane shift outputs are not driven during a ROLL command.

The shifting pattern of a ROLL operation is ideal for shuffling operations (such as transforms), in which the swapping of pattern blocks is pervasive. The ROLL operation also provides reversal capability that may be useful for pattern reflections.

5.4 The Conditional (Gated) Shift Operation

Conditional shifting (ns:=nif/sif, ew:=eif/wif) provides a shift to or from a PE 300 only where the contents of the PE 300 shift mask (xf register 410 for east/west, yf register 418 for north/south) is active (e.g., equal to 1). When the shift mask is active for a particular shift direction (n/s, e/w), shifts are performed normally in that direction. When the shift mask is inactive, the PE 300 propagates an input of 0, and propagates an output of 0. A conditional shift in the north-south direction is determined by logically AND-ing the contents of the ns and yf registers. A conditional shift in the east-west direction is determined by logically AND-ing the contents of the ew and xf registers.

With the conditional shift capability, shifts within a PE array 102 may be confined to only a subset of the entire array 102, with regions being designated as either "active" or "inactive." Prior to any shifting, active regions are initialized with active shift masks, and inactive regions are initialized with inactive shift masks. In this manner, when a shift operation is specified in a command word that is supplied to the PE array 102 as a whole, data that is shifted out of an active region (under a region mask) is inhibited from propagating into an inactive region. Furthermore, data within the inactive region propagates into the active region only as a 0 value. As a result, data is prevented from "bleeding" out of or into a region.

5.5 The Carry Propagate Operation

In another aspect of the invention, carry propagation logic (ncy, scy, ecy, wcy) provides a means for using multiple PEs 300 in combination to perform a multi-bit sum. In one exemplary embodiment, this feature is restricted to propagations in a single direction at a time (N, S, E or W) and is limited as to propagation distance within a single clock because a ripple approach is employed.

An example of an operation in which carry propagate might be used is a 16-bit add where four PEs 300 operate upon four bits of each operand at a time. For the purpose of illustration, let the operands be called L, R and A where L and R are summed to produce A. The sum image can be represented as shown below:

|       | PE0      | PE1       | PE2        | PE3         |
|-------|----------|-----------|------------|-------------|
| adr=0 | L0+R0+0  | L4+R4+ci  | L8+R8+ci   | L12+R12+ci  |
| adr=1 | L1+R1+c  | L5+R5+c   | L9+R9+c    | L13+R13+c   |
| adr=2 | L2+R2+c  | L6+R6+c   | L10+R10+c  | L14+R14+c   |
| adr=3 | L3+R3+c  | L7+R7+c   | L11+R11+c  | L15+R15+c   |

In this example, four bit planes are used to store each of the 16-bit images (only A is shown above). The first bit of image A is located in PE0 at adr=0 and is generated by summing L0 and R0. Since this is the least significant bit, no carry is propagated to this sum. For the remaining bits in PE0 (A1–A3), a carry is propagated from the previous bit sum (for A1, c is the carry out of L0+R0, etc.). The carry input to the sum L4+R4, located in PE1, is the same as the carry out from the L3+R3+c sum in PE0. This pattern repeats for each of the remaining PEs 300.

Clearly, in this example, there is a difficulty in performing the adr=0 bitplane operation when, for PE1, PE2 and PE3, the result of the adr=3 bitplane operation is required. This is resolved by performing the operation in three steps.

1. Perform a 4-bit add to generate the carry out for each PE 300.
2. Perform a propagation of the carry out to the neighboring PE 300.
3. Repeat the 4-bit add, using the carry in from the preceding PE 300.

This series of steps would need to be carried out once for each of the four PEs 300 if there were not a means for propagating the carry across all of the PEs 300 in a single step. This is accomplished by computing, in step 1 above, two carry outputs for each PE 300. The first carry out is the carry assuming a carry-in had been 0 (c0). The second carry out is the carry assuming the carry-in had been 1 (c1). The "real" carry out, then, is 1 if c0=1 or if c1=1 and the carry-in (ci) actually is 1. This is expressed:

$$cy = c0 | (c1 \,\&\, ci);$$

Since the cy for one PE 300 is the ci for the next PE in the series, the cy for the second PE 300 is computed by substituting as follows:

$$cy(PE1) = c0(PE1) | (c1(PE1) \,\&\, (c0(PE0) | (c1(PE0) \,\&\, ci(PE0))));$$

This carry propagation may be rippled across the PEs 300, with each PE 300 adding two gates of delay to the total.

The computation of c0 and c1 is done with a single pass by performing the add with a carry-in of 1, propagating the carry to the c register 426 and a zero flag to the z register 428. The z register 428 will be 1 if the sum is 0 or the sum is 16 (for the example above). A sum of 16 means the sum with carry in of 0 would have been 15. Since the c0 condition is true for all cases of c1=1 except where (in the example) the sum "would have been" 15 with carry-in of 0, (i.e., the sum "is" 16 with carry-in of 1), the value of c0 may be derived from the c and z registers 426, 428 as:

$$c0 = c \,\&\, !z;$$

This in turn gives:

$$cy = (c \,\&\, !z) | (c \,\&\, ci);$$

$$cy = c \,\&\, (!z | ci);$$

In these expressions, | defines a logical OR, and ! defines a logical NOT. The expression for the carry-out (cy) is implemented as shown in Table 3 to generate the (no, so, eo or wo) outputs in response to the (ns=scy, ns=ncy, ew=wcy or ew=ecy) commands respectively. The (scy, ncy, wcy, ecy) signals in the expression represent the carry-in for each PE 300. As shown in Table 2, these signals are generated by gating (AND-ing) the PE input signals (ni, si, ei, wi) with the xf/yf registers 410, 418. This gating allows the establishment of carry propagate boundaries so that PE0, in the example above, will not propagate a carry-in from a neighboring PE 300. The partitioning of the array into multi-bit PE groups, therefore, is accomplished through a simple mask loaded to the xf or yf registers 410, 418.

The maximum carry propagate distance both within the interior of the PE array 102 and wherever a chip boundary is crossed is device-specific (e.g., this property depends on the characteristics of the ASIC). The carry propagate may be performed in either the north/south or east/west directions.

In effect, carry propagation logic provides a means for combining the computations from multiple PEs 300 in order to complete an n-bit operation in fewer than n clocks. In other words, carry propagation logic makes it possible to perform multi-bit computations by joining individual PEs 300 into "supercells" in those situations where a "coarser" grain processor can be tolerated (e.g., where the application does not demand a fine grain processor). This capability introduces a new dimension in making run-time tradeoffs between memory and speed requirements. More particularly, where the number of PEs 300 combined for each computation is "m", a tradeoff between number of computations and computation speed (<n clocks per operation) is possible. Further, with the carry propagation logic, it is possible to effectively divide the image into smaller chunks. This has the effect of providing a "deeper" memory.

5.6 The Shift Bypass Operation

Another type of shift operation is the shift bypass operation. The shift bypass operation (ns:=nbyp/sbyp, ew:=ebyp/wbwp) provides a means for data to shift by more than one PE 300 during any given clock. This is accomplished by allowing the input data of a PE 300 to be routed to that PE's output during the shift, thereby preempting the PE's own data output. (In other words, the data received by the PE 300 is supplied directly as an output signal of the PE 300 during a single clock cycle.) A datum can therefore be shifted through a number of PEs 300 during a given clock. This does not mean that the entire bit plane is shifting by multiple PEs 300 during the clock. In other words, the overall shift bandwidth has not increased. Only selected data bits are shifted in this way. A PE 300 is bypassed if the contents of its shift mask (xf register 410 for east/west, and yf register 506 for north/south) are 1.

Because this approach provides a ripple effect (i.e., there is no "bypass look-ahead"), the bypass distance, according to one exemplary embodiment, is necessarily limited by the propagation delays of the logic. Consequently, the maximum shift distance both within the interior of the PE array 102 as well as where a chip boundary is crossed is device specific.

Table 3 shown below summarizes the above-described shift operations. The symbols used in the Table have the following meaning: logical OR (|); logical AND (&); logical XOR (^); logical NOT (!); equal (=); and not equal (!=). Within a particular field of the command word, the commands which can be specified by the field may be numbered. The numeric values in the "CONDITIONS" column pertains to such a number assigned to a command field permutation. The numbering scheme is, of course, arbitrary.

TABLE 3

| Signal | XROLL | YROLL | Conditions | Definition |
|---|---|---|---|---|
| no | 0 | 1 | | ns |
| | 0 | 0 | ns_sel = 3(si) or al_sel = 3(si) | ns |
| | 0 | 0 | ns_sel = 9(sbyp) | (ns&yf) \| (si&!yf) |
| | 0 | 0 | ns_sel = 13(scy) | c & (!z\|(si&yf)) |
| | 0 | 0 | ns_sel = 15(sif) | ns & yf |
| so | 0 | 1 | | ew |
| | 0 | 0 | ns_sel = 2(ni) or al_sel = 2(ni) | ns |
| | 0 | 0 | ns_sel = 8(nbyp) | (ns&yf) \| (ni&!yf) |
| | 0 | 0 | ns_sel = 12(ncy) | c & (!z\|(ni&yf)) |
| | 0 | 0 | ns_sel = 14(nif) | ns & yf |

TABLE 3-continued

| Signal | XROLL | YROLL | Conditions | Definition |
|---|---|---|---|---|
| eo | 1 | 0 | | ew |
| | 0 | 0 | ew_sel = 3(wi) or bl_sel = 3(wi) | ew |
| | 0 | 0 | ew_sel = 9(wbyp) | (ew&xf) \| (wi&xf) |
| | 0 | 0 | ew_sel = 13(wcy) | c & (!z\|wi&xf)) |
| | 0 | 0 | ew_sel = 15(wif) | ew & xf |
| wo | 1 | 0 | | ns |
| | 0 | 0 | ew_sel = 2(ei) or bl_sel = 2(ei) | ew |
| | 0 | 0 | ew_sel = 8(ebyp) | (ew&xf) \| (ei&!xf) |
| | 0 | 0 | ew_sel = 12(ecy) | c & (!z\|(ei&xf)) |
| | 0 | 0 | ew_sel = 14(eif) | ew & xf |
| ns_op | 0 | 1 | | (si&!yf) \| (ew&yf) |
| | 1 | 0 | | (ei&!yf) \| (ew&yf) |
| | 0 | 0 | | ns |
| ew_op | 1 | 0 | | (wi&!xf) \| (ns&xf) |
| | 0 | 1 | | (ni&!xf) \| (ns&xf) |
| | 0 | 0 | | ew |

6. Global Inputs and Outputs

6.1 CHIP_GLOR, OVER, and QUAD_GLOR

As shown in FIGS. 5A, 5B and 5C, each PE 300 generates signals that are combined to create chip global outputs. These PE signals include PE glor (pe_glor) and overflow (over). The pe_glor signal 566 is defined as (z ^ op_cmd) & d, where "^" denotes logical XOR, z denotes the contents of the z register 428, d denotes the contents of the d register 414, and op_cmd is a particular bit in the command word. For each of the array quadrants, these pe_glor signals are logically OR-ed together to produce a global OR value, referred to as QUAD_GLOR, for the respective one of the four quadrants of the array. The four QUAD_GLOR values, in turn, are logically OR-ed together to form a global OR for the entire chip, which is referred to as CHIP_GLOR.

The over signal value 568 is used in the detection of overflow conditions and operates simply by comparing the output of the z register 428 to its input (i.e., the output of a z multiplexer 522) on a given clock. Any change in the z register value, detected under certain conditions, may be indicative of an overflow. In the exemplary embodiment, the "over" signal is not maskable. The over signals from individual PEs are combined to form a chip OVER signal.

FIGS. 6A, 6B, 6C, 7A, 7B and 7C show, in greater detail, how the QUAD_GLOR, CHIP_GLOR and OVER values are computed using the architecture of an exemplary MCC chip. Generation of the global OR values begins by combining the pe_glor outputs of all PEs 300 within a 4×4 PE group to create a single, registered 4×4 GLOR output for the group. The GLOR output from each of the 4×4 PE groups (e.g., PEG 714) is supplied to a respective input of an OR gate 710. A remaining input 704 of the OR gate 710 receives an output signal from a preceding PEG in the quadrant. The output 711 of the OR gate 704 is an output signal for this PEG.

By combining the PEG GLOR output signals 711 within a quadrant (e.g., the north-west quadrant 600) as shown, a QUAD_GLOR signal 641 for that quadrant is generated (FIG. 6A). The QUAD_GLOR signals 641 are each supplied to a respective one of the 4Q Controllers (NWQ Controller 652, NEQ Controller 654, SWQ Controller 656, and SEQ Controller 658). The QUAD_GLOR signals are also supplied to respective inputs of a 4-input OR gate 648, which generates the CHIP_GLOR signal.

The CHIP_GLOR signal is fed to an input of multiplexor 693. The GLOR_IN signal is fed to another input of the multiplexor 693. Depending on the selection input to the multiplexor 693, either the CHIP_GLOR signal or the GLOR_IN signal is forwarded to the CHIP DATA Controller 208 (which includes a register for storing this data).

The OVER signal is generated in a similar manner. Namely, generation of the OVER value begins by combining the over outputs of all PEs 300 within a 4×4 PE group to create a single, registered 4×4 OVER output for the group. The OVER output from each of the 4×4 PE groups is supplied to a respective input of an OR gate 712. A remaining input 706 of the OR gate 712 receives an output signal from a preceding PEG in the quadrant. The output 713 of the OR gate 712 is a PEG OVER output signal for this PEG. The OVER output signals 713 within a quadrant (e.g., the north-west quadrant 600) are combined with the OVER output signals 713 from another quadrant on the same half of the array (e.g., the south-west quadrant 602) using OR gate 640. The output signal 639 of OR gate 640 is then combined in OR gate 670 with a like signal generated from the other half of the array.

Note that, in comparison to the CHIP_GLOR signal, the OVER signal is registered twice instead of once. Also, because there is no QUAD_OVER signal, the 16 PEG OVER signals are combined directly to provide the chip OVER signal.

The CHIP_GLOR signal and the OVER signals are fed to two inputs of multiplexor 691. Depending on the selection input to the multiplexor 691, either the CHIP_GLOR signal or the OVER signal are output via the GSTAT line 220. The GVLD_VLD signal 218 (which is shown in FIG. 2) indicates when the GSTAT signal 220 is valid so that external sampling may be easily accomplished without resorting to an elaborate means of synchronization.

The CHIP_GLOR is useful in determining the value stored by one particular PE in the array. To perform this operation, it is possible to set a mask in the d register which selects one PE, and then extract the value stored by that PE through the CHIP_GLOR operation. When op_cmd=1 for the PEs, the value of the z register 428 is inverted before masking and contributing to GLOR. This allows a global NAND in addition to global OR, thereby providing occurrence-of-0 detection.

The 4Q Controller 210 is also used to broadcast information back into the array 102. More specifically, the quadrant controllers, in conjunction with the overlay logic 230, transfers global values to respective ones of the quad buffers (NWQ Buffer 660, NEQ Buffer 662, SWQ Buffer 664 and SEQ Buffer 666), along with the controls for quadrant GLOR broadcast. The GLOR broadcast data is supplied to the PEGs as scalar data with the appropriate memory controls for propagating scalar data. More specifically, with reference to FIGS. 7A, 7B and 7C, the scalar information can be fed to the PEGs via the scalar paths 407 and 409, on the basis of control information input to the memory control register 746.

CHIP_GLOR values are broadcast in a similar manner, except that the same data is supplied to all four quad buffers.

Figure 9:
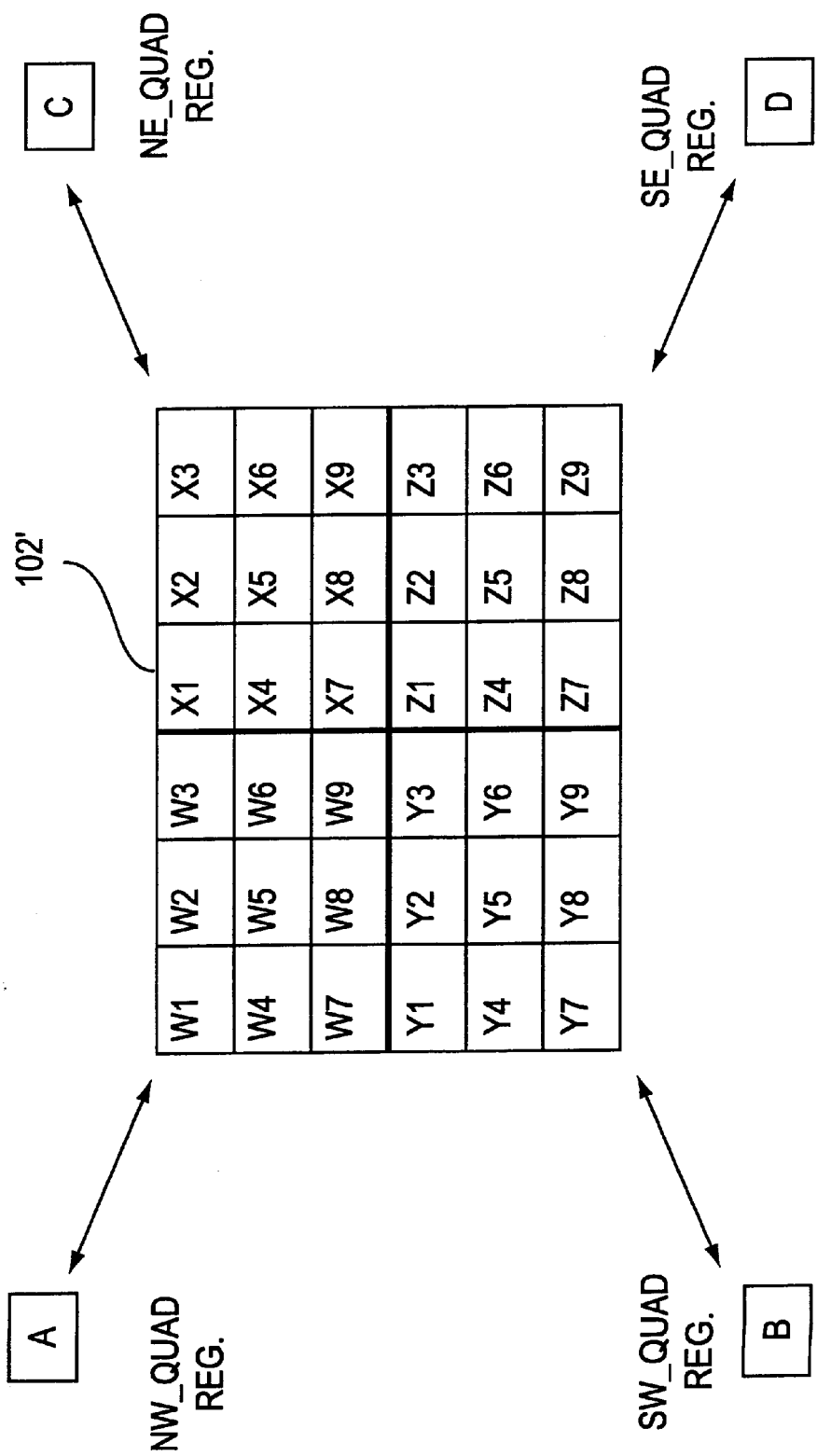
FIG. 9 is a high level conceptual depiction of the 4Q Controller registers and their relationship to the PE array.

To summarize, FIG. 9 shows, on a more conceptual level, an example of how the four registers of the quadrant controllers (NWQ Register, SWQ Register, NEQ Register and the SEQ Register) relate to four quadrants of an exemplary 6×6 array. The NWQ Register stores data associated with the north-west quadrant of the array, the SWQ Register stores data associated with the south-west quadrant of the array, the NEQ Register stores data associated with the north-east quadrant of the array, and the SEQ Register stores data associated with the south-east quadrant of the array. For instance, the value "a" stored in the NWQ Register can represent a global OR of the pe_glor signals (w1–w9) generated by PEs located in the north-west quadrant. The CHIP_GLOR signal corresponds to the logical OR of signals a, b, c and d stored in the quadrant registers. The values stored in the quadrant registers can also be propagated back into the array using the mechanism discussed above.

6.2 Row and Column GLOR

The ROW_GLOR signal is generated by OR-ing all contributions from the PEs 300 in a row of the PE array 102 to generate a single-bit row signal, doing this for each row of the PE array 102, and propagating the row signals to respective bits of the Y Pattern register 212. Likewise, the COL_GLOR signal is generated by OR-ing all contributions from the PEs 300 in a single column of the PE array 102 to generate a single-bit column signal, doing this for each column in the PE array 102, and propagating column signals into respective bits of the X Pattern register 222. The contribution of each PE 300 to the ROW_GLOR and COL_GLOR signals is computed by AND-ing the ns/ew value with the yf/xf value (e.g., row_glor:=ns&yf).

The mapping of row/col GLOR signals to the pattern registers is the same as for the XPAT/YPAT pattern propagation operations of the shift planes. Accordingly, the formation of the row and column GLOR signals may be viewed as the "reverse" of the XPAT/YPAT propagation operations discussed above in Section No. 4.2.

The ROW_GLOR and COL_GLOR signals can be used to extract values from a particular row or column. For instance, to extract the values of a particular row, the programmer could activate the yf registers for that row and extract a COL_GLOR signal that would provide a multi-bit representation of the data in that row. The entire array can be extracted in this manner by iteratively selecting different rows. This might be useful to test the MCC.

The X Pattern and Y Pattern registers 222, 212, may also be used to directly feed their contents back into the PE array 102. That is, once the ROW_GLOR and COL_GLOR signals are received in the Y and X Pattern registers, this global information can be propagated back into the array in a manner similar to that discussed in Section No. 4.2 above.

FIGS. 6A, 6B, 6C, 7A, 7B and 7C provide more exemplary details on how the above-described functions can be implemented in a MCC chip. ROW_GLOR and COL_GLOR values are extracted from each PEG as multi-bit data as shown in FIGS. 7A, 7B and 7C. The ROW_GLOR output is fed to an OR gate 724 (FIG. 7B) to generate an output signal 723. COL_GLOR data is fed to an OR gate 708 (FIG. 7A) to generate an output signal 707. As in the case with the OR gates 710 and 712, the COL_GLOR OR gate 708 receives an input 702 from another 4×16 PEG.

Accordingly, a 4×16 PEG will have four bits of ROW_GLOR data and sixteen bits of COL_GLOR data (reflecting the PEG dimensions). The ROW_GLOR signals from each 4×16 PEG are combined with those of other PEGs to produce the multi-bit chip ROW_GLOR signal 651 reflecting the row OR values. The chip ROW_GLOR signal 651 is supplied to the Y Pattern register 212. Similarly, the COL_GLOR signals from each PEG are combined with those of other PEGs to produce, in the X Pattern register 222, the multi-bit chip COL_GLOR. More specifically, the OR gates 642 and 644 are used to combine the COL_GLOR outputs from north-west and south-west quadrants, and from the north-east and south-east quadrants, respectively. The resultant multi-bit chip COL_GLOR signals 681 and 683 are fed to X Pattern register 222.

6.3 Application of QUAD_GLOR Broadcast in Image Correlation

The Minimum Absolute Different provides a measure of the similarity (correlation) between a source pattern (image S) and a reference pattern (image R). The correlation is computed by effectively sliding the reference pattern over the source pattern and determining the relative measure of correlation at each position. For example, the following shows how a 3×3 reference pattern is applied to a 5×5 source image.

```
1)      R   r   r   .   .
        r   r   r   .   .
        r   r   r   .   .
        .   .   .   .   .
        .   .   .   .   .

2)      .   R   r   r   .
        .   r   r   r   .
        .   r   r   r   .
        .   .   .   .   .
        .   .   .   .   .

3)      .   .   R   r   r
        .   .   r   r   r
        .   .   r   r   r
        .   .   .   .   .
        .   .   .   .   .

9)      .   .   .   .   .
        .   .   .   .   .
        .   .   R   r   r
        .   .   r   r   r
        .   .   r   r   r result:
        c   c   c   .   .
        c   c   c   .   .
        c   c   c   .   .
        .   .   .   .   .
        .   .   .   .   .
```

The above shows the sequence of correlation operations as image R is applied to image S. The upper-case "R" shows the location to which the correlation result is written in the resultant image "C" (correlation). The correlation at each position is computed by summing the absolute value of the differences between corresponding image values. In step 1, for example, the correlation value $c_{00}=|r_{00}-s_{00}|+|r_{01}-s_{01}|+ \ldots +|r_{22}-s_{22}|$. In step 2, $c_{01}=|r_{00}-s_{01}|+|r_{01}-s_{02}|+ \ldots +|r_{22}-s_{23}|$, etc.

The method outlined above shows an iterative process whereby one value of C is computed for each iteration. Each iteration involves a s ingle multiply (in the 2-D SIMD) and a 3×3 box sum which is accomplished in 4 adds in the SIMD. Where the size of the reference pattern is at least half the size of the source pattern (in each dimension), this approach is fairly optimal.

Where a relatively small reference pattern is employed, it may be seen that the above approach would require lengthy computation. For example, a 3×3 reference pattern in a 64×64 image would require (64-2)×(64-2)=3844 iterations. A different approach to this example is to apply the reference pattern values to the image globally, thereby performing a number of iterations in accordance with the reference pattern size (e.g., for a reference size of 3×3=9, 9 iterations are performed). Rather than moving the reference image, the source image is moved in this approach.

Consider the original example of the 5×5 source image and the 3×3 reference image. The following steps could be performed.

1) Subtract image S from $r_{00}$ ($r_{00}$ is supplied globally) and take the absolute value of this result. At the end of this step, $c_{00}=|s_{00}-r_{00}|$, $c_{01}=|s_{01}-r_{00}|$, etc.

2) Shift image S to the west so that $s_{01}$ is located at 00, etc. Now subtract $r_{01}$ from this shifted S, take the absolute value, and then add this result to the accumulating correlation image C. Now $c_{00}=|s_{00}-r_{00}|+|s_{01}-r_{01}|$, and so on.

3–9) Continue to shift S west and south in a raster fashion (similar to the shifting of R in the original example) until all 9 differences have been accumulated.

At the end of this process, the correlation image C has valid MAD values at each of the 'c' positions as shown in the original example. Clearly, where a whole-image correlation is computed using a relatively small reference pattern, this method has significant merit.

Occasionally, it is desirable to perform correlations upon "blocks" of values within an image (i.e., image segments). The image blocks may or may not represent contiguous image segments and the reference patterns may differ from one block to the next. This Minimum Absolute Difference with Block Correlation (MAD-BC) approach is easily applied to an array where the blocks are MCC IC dimensions. A correlation algorithm such as the one described above may be implemented wherein each MCC broadcasts a different reference value on a given iteration, drawing this value from a unique reference pattern assigned to that MCC. On each iteration, a reference value load to the register of the CHIP DATA controller 208 of each MCC 100 in the array is required. This is followed by the broadcast, subtract, absolute value and shift for one iteration of the correlation algorithm. In this manner, a separate reference pattern is applied to the source image segments which correspond to MCC boundaries within the array, providing a block correlation.

The granularity of the block correlation can be further extended by using the QUAD GLOR capabilities of the MCC to provide correlations on block sizes of 16×16. This is accomplished in a similar manner to the MAD-BC description above except that 4 loads, one to each quadrant GLOR register, is required for each MCC in the array on each iteration. For some applications, the use of QUAD GLOR to perform MAD-BC correlations provides speed improvement of 8 to 1 or more.

The invention has been described with reference to a particular embodiment. However, it will be readily apparent to those skilled in the art that it is possible to embody the invention in specific forms other than those of the preferred embodiment described above. This may be done without departing from the spirit of the invention. The preferred embodiment is merely illustrative and should not be considered restrictive in any way. The scope of the invention is given by the appended claims, rather than the preceding description, and all variations and equivalents which fall within the range of the claims are intended to be embraced therein.

What is claimed is:

1. A parallel processor, comprising:

a plurality of processing elements (PEs) arranged in an array to form a PE array having a plurality of rows and columns, such that each PE has a north neighbor, a south neighbor, a west neighbor and an east neighbor, further wherein said PE array encompasses a plurality of sections, each section containing a group of PEs;

logic, within each PE, for generating an output signal;

a command generator for broadcasting a control word into the array, wherein said control word is received by each said PE within said array, and is used by each said PE to govern the manner in which it processes information; and at least one section OR logic, each for computing for one section, the logical OR of said PE output signals generated only by PEs within said one section, wherein the logical OR of said PE output signals generated only by PEs within said at least one section indicates whether any of said PEs within said at least one section generated a signal having a predetermined value.

2. The parallel processor of claim 1, further comprising plural registers respectively associated with said plural sections, for storing information respectively associated with said plural sections.

3. The parallel processor of claim 2, wherein said information stored within said plural registers comprises, for each register, the logical OR of said PE output signals generated by PEs within a respective section.

4. The parallel processor of claim 1, wherein each PE includes:

a bit-plane register for storing a value from a bit plane; and a mask register for storing a mask value, wherein said logic for generating said output signals for each PE comprises means for AND-ing the mask value with the value from the bit plane.

5. The parallel processor of claim 1, wherein said plural sections comprise plural rows of said PE array.

6. The parallel processor of claim 5, further including a pattern register including plural storage elements, wherein each storage element of said register stores a value pertaining to said logical OR of output signals, which is generated by combining PE output signals within a respective row of said PE array.

7. The parallel processor of claim 1, wherein said plural sections comprise plural columns of said PE array.

8. The parallel processor of claim 7, further including a pattern register including plural storage elements, wherein each storage element of said register stores a value pertaining to said logical OR of output signals, which is generated by combining PE output signals within a respective column of said PE array.

9. The parallel processor of claim 1, wherein said plural sections comprise four quadrants of said PE array.

10. The parallel processor of claim 9, further including four quadrant registers, wherein each register stores a value pertaining to said logical OR of output signals, which is generated by combining PE output signals within a respective quadrant.

11. A parallel processor, comprising:

a plurality of processing elements (PEs) arranged in an array to form a PE array having a plurality of rows and columns, such that each PE has a north neighbor, a south neighbor, a west neighbor and an east neighbor, further wherein said PE array encompasses a plurality of sections, each section containing a group of PEs;

a command generator for broadcasting a control word into the array, wherein said control word is received by each said PE within said array, and is used by each said PE to govern the manner in which it processes information; and a plurality of registers associated with each of said sections, each for storing a value pertaining to its respective section of said PE array; and logic for retrieving a value from at least one register and for broadcasting said value only into its respective section of said PE array.

12. The parallel processor according to claim 11, wherein said plural registers comprise four registers associated, respectively, with four quadrant sections of said PE array.

13. A method for processing data in parallel using a parallel processor, wherein said parallel processor comprises a plurality of processing elements (PEs) arranged in an array to form a PE array, wherein said PE array encompasses a plurality of sections, each section containing a group of PEs, said method comprising the steps of:

for each PE, generating an output signal; and separately computing, for each of at least one section, the logical OR of said PE output signals generated only by PEs within said at least one section, wherein the logical OR of said PE output signals generated only by PEs within said at least one section indicates whether any of said PEs within said at least one section generated a signal having a predetermined value.

14. The method of claim 13, further comprising the step of storing information associated with said plural sections in plural respective registers.

15. The method of claim 14, wherein said stored information comprises, for each register, the logical OR of said PE output signals generated by PEs within a respective section.

16. The method of claim 13, wherein, for each PE, the output signal is generated by AND-ing a mask value with a bit plane value.

17. The method of claim 13, wherein said plural sections comprise plural rows of said PE array.

18. The method of claim 17, further including the step of storing a logical OR for each of said rows in a pattern register, each logical OR representing the logical OR of output signals generated by PEs within a respective row.

19. The method of claim 13, wherein said plural sections comprise plural columns of said PE array.

20. The method of claim 19, further including the step of storing a logical OR for each of said columns in a pattern register, each logical OR representing the logical OR of output signals generated by PEs within a respective column.

21. The method of claim 13, wherein said plural sections comprise four quadrants of said array.

22. The method of claim 21, further including the step of storing a logical OR for each of said quadrants in four respective registers, each logical OR representing the logical OR of output signals generated by PEs within a respective quadrant.

23. A method for processing data in parallel using a parallel processor, wherein said parallel processor comprises a plurality of processing elements (PEs) arranged in an array to form a PE array, wherein said PE array encompasses a plurality of sections, each section containing a group of PEs, and wherein each section has a register associated therewith, said method comprising the steps of:

storing a value in each register associated with its respective section;

retrieving a value from at least one register to produce a retrieved value; and broadcasting the retrieved value only into the section of the PE array associated with the at least one register.

24. The method of claim 23, wherein there are four sections, and four registers associated therewith.

* * * * *